(12) United States Patent
Gilliam et al.

(10) Patent No.: US 9,441,133 B2
(45) Date of Patent: *Sep. 13, 2016

(54) ORGANIC RESIN LAMINATE, METHODS OF MAKING AND USING THE SAME, AND ARTICLES COMPRISING THE SAME

(75) Inventors: Mary Gilliam, Novi, MI (US); Koichi Higuchi, Gunma-ken (JP)

(73) Assignees: EXATEC, LLC, Wixom, MI (US); SHIN-ETSU CHEMICAL CO., LTD. (JP)

(*) Notice: Subject to any disclaimer, the term of this patent is extended or adjusted under 35 U.S.C. 154(b) by 26 days.

This patent is subject to a terminal disclaimer.

(21) Appl. No.: 13/259,855

(22) PCT Filed: Aug. 26, 2011

(86) PCT No.: PCT/US2011/049300
§ 371 (c)(1),
(2), (4) Date: Sep. 23, 2011

(87) PCT Pub. No.: WO2013/032421
PCT Pub. Date: Mar. 7, 2013

(65) Prior Publication Data
US 2014/0170400 A1    Jun. 19, 2014

(51) Int. Cl.
| B32B 33/00 | (2006.01) |
| C09D 133/14 | (2006.01) |
| B05D 1/00 | (2006.01) |
| C08J 7/04 | (2006.01) |
| C09D 133/06 | (2006.01) |
| C09D 143/04 | (2006.01) |
| C09D 7/12 | (2006.01) |
| B32B 7/02 | (2006.01) |

(52) U.S. Cl.
CPC .............. *C09D 133/14* (2013.01); *B05D 1/62* (2013.01); *B32B 33/00* (2013.01); *C08J 7/042* (2013.01); *C08J 7/045* (2013.01); *C09D 7/1208* (2013.01); *C09D 133/062* (2013.01); *C09D 143/04* (2013.01); *B32B 7/02* (2013.01); *C08J 2369/00* (2013.01); *C08J 2433/04* (2013.01); *C08J 2433/14* (2013.01); *C08J 2439/04* (2013.01); *C08J 2443/04* (2013.01); *Y10T 428/24942* (2015.01); *Y10T 428/24983* (2015.01); *Y10T 428/265* (2015.01); *Y10T 428/31507* (2015.04); *Y10T 428/31663* (2015.04)

(58) Field of Classification Search
None
See application file for complete search history.

(56) References Cited

U.S. PATENT DOCUMENTS

| 4,137,365 | A | * | 1/1979 | Fletcher | B05D 1/62 427/489 |
| 4,492,733 | A | * | 1/1985 | Phillips | B05D 3/148 427/387 |
| 4,649,071 | A | * | 3/1987 | Tajima | B05D 1/62 427/488 |
| 4,778,721 | A | * | 10/1988 | Sliemers | B05D 1/62 427/578 |
| 4,842,941 | A | * | 6/1989 | Devins | B05D 1/62 427/162 |
| 4,927,704 | A | * | 5/1990 | Reed | B05D 1/62 427/249.15 |
| 5,061,567 | A | * | 10/1991 | Brochot | C03C 17/30 204/165 |
| 5,191,045 | A | | 3/1993 | Funaki et al. | |
| 5,298,587 | A | * | 3/1994 | Hu | C23C 16/30 427/489 |
| 5,391,795 | A | | 2/1995 | Pickett | |
| 5,494,712 | A | * | 2/1996 | Hu | C23C 16/30 427/294 |
| 5,569,497 | A | * | 10/1996 | Verzaro | B05D 1/62 427/255.37 |
| 5,618,619 | A | * | 4/1997 | Petrmichl | B05D 1/62 427/527 |
| 5,718,967 | A | * | 2/1998 | Hu | B05D 1/62 427/489 |
| 5,846,649 | A | * | 12/1998 | Knapp | B05D 1/62 428/334 |
| 5,948,484 | A | * | 9/1999 | Gudimenko | C08F 8/42 427/489 |
| 6,207,238 | B1 | * | 3/2001 | Affinito | B05D 1/62 427/398.1 |

(Continued)

FOREIGN PATENT DOCUMENTS

| CN | 1965104 A | 5/2007 | |
| DE | 10012516 C1 | * 12/2001 | ............ C23C 16/029 |

(Continued)

OTHER PUBLICATIONS

Japanese Patent No. 04106161 (A); Publication Date: Apr. 8, 1992; Abstract Only; 1 Page.

(Continued)

*Primary Examiner* — Samir Shah
*Assistant Examiner* — Zheren J Yang
(74) *Attorney, Agent, or Firm* — Cantor Colburn LLP

(57) ABSTRACT

An organic resin laminate comprising an organic resin substrate and a multilayer coating system thereon has weather resistance and mar resistance. The multilayer coating system includes an outermost layer (I) which is a hard film resulting from plasma polymerization of an organosilicon compound and an intermediate layer (II) which is a cured film of a composite coating composition (2) comprising inorganic oxide nanoparticle and vinyl copolymer.

18 Claims, No Drawings

(56) References Cited

U.S. PATENT DOCUMENTS

| | | | |
|---|---|---|---|
| 6,213,049 B1 | 4/2001 | Yang | |
| 6,214,416 B1 | 4/2001 | Sakagami et al. | |
| 6,348,237 B2* | 2/2002 | Kohler | 427/249.15 |
| 6,376,064 B1* | 4/2002 | Gasworth | B05D 7/52 427/407.1 |
| 6,432,494 B1 | 8/2002 | Yang et al. | |
| 6,641,673 B2 | 11/2003 | Yang | |
| 6,681,716 B2 | 1/2004 | Schaepkens | |
| 6,948,448 B2 | 9/2005 | Schaepkens | |
| 7,056,584 B2 | 6/2006 | Iacovangelo | |
| 7,157,146 B2 | 1/2007 | Higuchi et al. | |
| 7,163,749 B2* | 1/2007 | Iacovangelo | C03C 17/009 428/447 |
| 7,282,244 B2 | 10/2007 | Schaepkens et al. | |
| 7,390,573 B2 | 6/2008 | Korevaar et al. | |
| 7,595,097 B2* | 9/2009 | Iacovangelo et al. | 427/578 |
| 7,645,492 B2 | 1/2010 | Gasworth | |
| 7,981,507 B2 | 7/2011 | Higuchi et al. | |
| 8,361,607 B2* | 1/2013 | Higuchi | C08J 7/045 428/217 |
| 8,809,438 B2* | 8/2014 | Higuchi et al. | 524/432 |
| 2002/0006487 A1* | 1/2002 | O'Connor | C08J 7/06 428/35.7 |
| 2002/0051889 A1* | 5/2002 | Kanamori et al. | 428/447 |
| 2002/0090521 A1* | 7/2002 | Nakajima | C23C 16/30 428/446 |
| 2002/0110695 A1* | 8/2002 | Yang | C03C 17/3417 428/447 |
| 2003/0087102 A1 | 5/2003 | Yamaya et al. | |
| 2004/0149225 A1* | 8/2004 | Weikart | B05D 1/62 118/723 MW |
| 2005/0202184 A1 | 9/2005 | Iacovangelo et al. | |
| 2005/0202259 A1* | 9/2005 | Korevaar | B05D 1/62 428/447 |
| 2005/0202263 A1* | 9/2005 | Sargent | C08J 7/042 428/500 |
| 2007/0026235 A1 | 2/2007 | Chen et al. | |
| 2007/0122598 A1* | 5/2007 | Coak | B05D 1/62 428/212 |
| 2007/0264508 A1* | 11/2007 | Gabelnick | B05D 1/62 428/447 |
| 2007/0286966 A1* | 12/2007 | Chen | C08J 7/045 427/569 |
| 2008/0096029 A1* | 4/2008 | Higuchi | C08J 7/047 428/447 |
| 2008/0160197 A1 | 7/2008 | Gasworth et al. | |
| 2008/0160205 A1 | 7/2008 | Gasworth | |
| 2008/0266492 A1 | 10/2008 | Jeng et al. | |
| 2008/0280149 A1 | 11/2008 | Higuchi et al. | |
| 2008/0286492 A1 | 11/2008 | Gasworth | |
| 2009/0042025 A1* | 2/2009 | Beldi | C23C 16/0245 428/336 |
| 2009/0104447 A1* | 4/2009 | Kita et al. | 428/412 |
| 2009/0208715 A1* | 8/2009 | Stowell | C23C 16/308 428/213 |
| 2010/0055476 A1* | 3/2010 | Haack | B05D 1/62 428/447 |
| 2010/0092781 A1* | 4/2010 | Zambov | C23C 16/30 428/412 |
| 2010/0112252 A1* | 5/2010 | Ito | B65D 23/0814 428/35.7 |
| 2010/0129646 A1* | 5/2010 | Fisk | C08G 18/0895 428/336 |
| 2010/0221557 A1 | 9/2010 | Higuchi et al. | |
| 2010/0227119 A1* | 9/2010 | Taha | B05D 1/62 428/141 |
| 2010/0261022 A1* | 10/2010 | Higuchi et al. | 428/446 |
| 2010/0279027 A1* | 11/2010 | Pingree | C23C 16/50 427/534 |
| 2010/0323127 A1* | 12/2010 | Rhoton | B05D 1/60 427/579 |
| 2010/0327629 A1* | 12/2010 | Suga | B32B 27/06 296/200 |

FOREIGN PATENT DOCUMENTS

| | | |
|---|---|---|
| EP | 0887437 A2 | 12/1998 |
| EP | 0931820 A1 | 7/1999 |
| EP | 2226352 A2 | 9/2010 |
| EP | 2239308 A1 | 10/2010 |
| JP | 53130732 A | 11/1978 |
| JP | 63168470 A | 7/1988 |
| JP | 2255532 A | 10/1990 |
| JP | H0314862 U | 2/1991 |
| JP | H0362177 U | 6/1991 |
| JP | 04106161 A | 4/1992 |
| JP | 4120181 A | 4/1992 |
| JP | 7278525 A | 10/1995 |
| JP | 11071681 A | 3/1999 |
| JP | 2000204301 A | 7/2000 |
| JP | 2000334373 A | 12/2000 |
| JP | 2001047574 A | 2/2001 |
| JP | 2001214122 A | 8/2001 |
| JP | 2002060687 A | 2/2002 |
| JP | 2002087817 A | 3/2002 |
| JP | 2002103507 A * | 4/2002 |
| JP | 2002187230 A | 7/2002 |
| JP | 2004131549 A | 4/2004 |
| JP | 2004238418 A | 8/2004 |
| JP | 2008120986 A | 5/2008 |
| JP | 2008274177 A | 11/2008 |
| JP | 2009067049 A * | 4/2009 |
| JP | 2009104407 A * | 5/2009 |
| JP | 2010202731 A | 9/2010 |
| JP | 2010253683 A * | 11/2010 |
| WO | 2009126722 A1 | 10/2009 |

OTHER PUBLICATIONS

Japanese Patent No. 2001047574 (A); Publication Date: Feb. 20, 2001; Abstract Only; 1 Page.

Japanese Patent No. 3102696 (B2); Publication Date: Oct. 23, 2000; Abstract Only; 2 Pages.

Japanese Patent No. 63168470 (A); Publication Date: Jul. 12, 1988; Abstract Only; 1 Page.

International Search Report; International Application No. PCT/US2011/049300; International Filing Date: Aug. 26, 2011; Date of Mailing: Mar. 19, 2012; 4 Pages.

Written Opinion of the International Searching Authority; International Application No. PCT/US2011/049300; International Filing Date: Aug. 26, 2011; Date of Mailing: Mar. 19, 2012; 7 Pages.

International Search Report; International Application No. PCT/US2011/032483; International Filing Date: Apr. 14, 2011; Date of Mailing: Dec. 21, 2011; 5 Pages.

Japanese Patent No. 2000204301 (A); Publication Date: Jul. 25, 2000; Machine Translation; 40 Pages.

Japanese Patent No. 2000334373 (A); Publication Date: Dec. 5, 2000; Machine Translation; 22 Pages.

Japanese Patent No. 2001-047574 (A); Publication Date: Feb. 20, 2001; Machine Translation; 23 Pages.

Japanese Patent No. 2001214122 (A); Publication Date: Aug. 7, 2001; Machine Translation; 21 Pages.

Japanese Patent No. 2002-060687 (A); Publication Date: Feb. 26, 2002; Machine Translation; 5 Pages.

Japanese Patent No. 2002087817 (A); Publication Date: Mar. 27, 2002; Machine Translation; 13 Pages.

Japanese Patent No. 2002187230 (A); Publication Date: Jul. 2, 2002; Machine Translation; 26 Pages.

Japanese Patent No. 2004238418 (A); Publication Date: Aug. 26, 2004; Machine Translation; 22 Pages.

Japanese Patent No. 2255532 (A); Publication Date: Oct. 16, 1990; Abstract Only; 1 Page.

Written Opinion of the International Searching Authority; International Application No. PCT/US2011/032483; International Filing Date: Apr. 14, 2011; Date of Mailing: Dec. 21, 2011; 7 Pages.

* cited by examiner

ORGANIC RESIN LAMINATE, METHODS OF MAKING AND USING THE SAME, AND ARTICLES COMPRISING THE SAME

TECHNICAL FIELD

Disclosed herein is an organic resin laminate with weather resistance and mar resistance, articles comprising the organic resin laminate, and methods for making and using the same.

BACKGROUND

Because of many advantages including impact resistance, light weight, and workability, organic resin materials are used in a wide variety of applications. Efforts are currently made to take more advantage of these properties. One such approach is to apply molded organic resins having enhanced surface hardness and abrasion resistance to the windows in various vehicles. In the glazing application, a high level of abrasion resistance and outdoor weather resistance comparable to glass are required. In the case of automobiles, for example, a high level of abrasion resistance is required in order to prevent the windshield from marring upon wiper operation and to prevent side windows from marring upon winding up-and-down operation. Potential service in a very high temperature and/or humidity environment must also be taken into account.

In the prior art, substrates of organic resins or plastics are surface coated with various coating compositions to form surface protective films for the purpose of imparting high hardness and mar resistance. For instance, compositions comprising hydrolyzates or partial hydrolyzates of hydrolyzable organosilanes and optionally, colloidal silica are known.

For instance, JP-A S51-2736, JP-A S53-130732 and JP-A S63-168470 disclose coating compositions comprising an organoalkoxysilane, a hydrolyzate and/or partial hydrolyzate of the organoalkoxysilane, and colloidal silica, wherein the alkoxy group is converted into silanol in the presence of excess water. However, these coatings resulting from wet coating systems suffer from problems of low hardness and poor mar resistance as compared with glass or the object to be replaced.

Several problems must be solved before coating films can withstand sunlight and weather over a long time. The wet or dry coating layers having mar resistance lack an ability to cut UV, and a phenomenon develops that a resin substrate, a primer layer for imparting substrate adhesion or an interface therebetween can be degraded or discolored by UV exposure. Several techniques are proposed to prevent such a phenomenon, including addition of UV absorber to the primer layer, and incorporation via chemical bonds of UV absorptive organic substituent groups into the organic resin of which the primer layer is formed. The UV absorptive organic substituent groups and UV absorbers refer to benzophenone, benzotriazole, triazine and similar substituent groups, and organic compounds containing the same. See JP-A H04-106161, JP 3102696, JP-A 2001-47574, and JP 3841141.

The above technique for cutting off UV is by incorporating an organic UV absorber into a primer layer. Since the primer layer in itself has the main purpose of improving the adhesion between the underlying substrate and a silicone layer, an extra amount of UV absorber loaded gives rise to problems such as losses of adhesion and transparency. It is demonstrated in a long-term outdoor exposure test and accelerated weathering test that the UV cut by the primer layer alone is insufficient for preventing degradation and discoloration of organic resin substrates.

One approach taken for compensating for such drawbacks was to add organic UV absorbers to silicone layers as well. However, simply adding such compounds to coating compositions results in a coating lacking durability. That is, the coating fails to sustain the desired UV absorbing property due to bleeding and drainage of UV absorber from the surface during long-term weather exposure. Then organic UV absorbers were developed which are silyl-modified so as to be chemically bondable with siloxane compounds, the main component of the coating layer. See JP-B S61-54800, JP-B H03-14862, JP-B H03-62177, and JP-A H07-278525. This measure improves retentivity since the UV absorber is strongly bound to the siloxane matrix. On the other hand, these coating layers become substantially poor in mar resistance that is essentially desired, or develop noticeable microcracks due to a lowering of flexibility. As discussed above, the organic UV absorbers have the essential drawback that the hardness of silicone film becomes lower as the amount of UV absorber added is increased to enhance weather resistance.

As discussed above, the wet and dry coating system is successful in imparting a high level of weather and mar resistance, but requires a multilayer coating process, with an urgent need for simplification of the multilayer deposition process to reduce processing time, increase yield, and ultimately reduce cost. The practical coating system is composed of at least four layers, organic resin substrate, primer layer, weather resistant layer, and dry abrasion resistant layer. Herein, the primer layer is mainly formed of acrylic coating, while the weather resistant layer is mainly formed of silicone hard coating. The system is produced by coating and curing a primer wet coating to an organic resin substrate, coating and curing a silicone hard coating thereto, and further forming an oxide coating by a dry process.

As discussed above, a number of attempts have been made to improve the weather resistance, mar resistance and other properties of wet and dry coating films. However, there is not available a laminate having a coating system which exhibits visible light transparency and UV shielding property, and sufficient weather resistance and durability to withstand prolonged outdoor exposure while maintaining a very high level of mar resistance (i.e., comparable to glass), the laminate being manufactured in a simple manner

SUMMARY

Disclosed herein are organic resin laminates and methods of making and using the same and articles made therefrom.

In an embodiment, an organic resin laminate having weather resistance and mar resistance, can comprise an organic resin substrate and a multilayer coating system on a surface of the substrate. The multilayer coating system can include an outermost layer (I) which is a hard film resulting from plasma polymerization of an organosilicon compound and an intermediate layer (II) which is a cured film formed from a composite coating composition (2), the intermediate layer (II) having one surface disposed contiguous to the outermost layer and another surface disposed contiguous to the organic resin substrate. The composite coating composition (2) cam comprise: (2-A) an inorganic oxide nanoparticle comprising a member selected from the group consisting of silica, zinc oxide, titanium oxide, cerium oxide, and combinations comprising at least one of the foregoing members; (2-B) a vinyl copolymer having an organic UV-absorptive group and a reactive group selected from among alkoxysilyl, hydroxyl, epoxy, carboxylic acid and amino groups; and (2-C) a solvent.

These and other non-limiting characteristics are more particularly described below.

DETAILED DESCRIPTION

More particularly, it relates to an organic resin laminate comprising a molded polycarbonate substrate and a multilayer coating system thereon, the multilayer coating system including an intermediate layer (II) in the form of a cured film of an inorganic oxide nanoparticle component and a vinyl copolymer component, and an outermost layer (I) in the form of a hard film of plasma polymerized organosilicon compound, e.g., a silicon oxide film formed by plasma enhanced chemical vapor deposition, deposited on the substrate in the described order, the multilayer coating system possessing a very high level of mar resistance, visible light transmitting and UV shielding properties, and long-term weather resistance.

Provided herein is a laminate comprising an organic resin substrate and a cured coating system thereon maintaining visible light transparency, exhibiting mar resistance and UV shielding properties, and also having sufficient weather resistance and durability to withstand prolonged outdoor exposure.

An organic resin laminate can comprise an organic resin substrate and a multilayer coating system thereon, the multilayer coating system including an intermediate layer (II) in the form of a cured coating of a composite coating composition comprising an inorganic oxide nanoparticle component and a vinyl copolymer component having an organic UV absorptive group on side chain, and an outermost layer (I) in the form of a hard film of plasma polymerized organosilicon compound, such as a silicon oxide film formed by plasma enhanced chemical vapor deposition (PECVD), deposited on a surface of the substrate in the described order. Then the prior art system comprising at least four layers (i.e., organic resin substrate, adhesion enhancing layer, weather resistant layer, and dry abrasion resistant layer) can be replaced by this novel simple coating system comprising at least three layers (organic resin substrate, intermediate layer (II), and outermost layer (I) serving as a dry abrasion resistant layer).

Not to be limited by theory, the intermediate layer (II) formed of a composite coating composition comprising a specific inorganic oxide nanoparticle component and a vinyl copolymer component having an organic UV absorptive group on side chain possesses a certain degree of abrasion resistance presumably attributable to the inorganic oxide nanoparticle component, sufficient to assist in the outermost layer (I) serving as the overlying dry abrasion resistant layer exhibiting a very high level of mar resistance, and imparting adhesion to the dry abrasion resistant layer. In addition, the intermediate layer (II) has improved adhesion to the substrate (e.g., due to the vinyl copolymer component), and possesses a high level of weather resistance due to the organic UV absorptive group contained in the vinyl copolymer component.

The laminate disclosed herein exhibits both high mar resistance and weather resistance. Specifically, the laminate (e.g., an organic resin laminate) comprises an organic resin substrate and a multilayer coating system on at least one surface of the substrate. The multilayer coating system includes an outermost layer (I) which is a hard film resulting from plasma polymerization of an organosilicon compound and an intermediate layer (II) which is a cured film of a composite coating composition (2), the intermediate layer (II) having one surface disposed contiguous to the outermost layer and another surface disposed contiguous to the organic resin substrate. The composite coating composition (2) comprises:

(2-A) an inorganic oxide nanoparticle, specifically comprising silica (silicon dioxide ($SiO_2$)), zinc oxide, titanium oxide, cerium oxide, and combinations comprising at least one of the foregoing;

(2-B) a vinyl copolymer having an organic UV-absorptive group and a reactive group, wherein the reactive group comprises alkoxysilyl, hydroxyl, epoxy, carboxylic acid, amino groups, combinations comprising at least one of the foregoing, and (2-C) a solvent.

In various embodiments, the outermost layer (I) is a hard film obtained from plasma polymerization and oxidation of an organosilicon compound and comprising silicon, oxygen, carbon, and hydrogen. More specifically, the hard film can be deposited using Expanding Thermal Plasma (ETP) deposition processes. See US Published Application No. 2005/0202263, JP-A 2009-540124, JP-A 2009-502569, U.S. Pat. Nos. 7,163,749, 7,056,584, 6,376,064, and 4,927,704.

The outermost layer (I) can include an inner sub-layer and an outer sub-layer. Optionally, the properties of the sub-layers can be adjusted so as to achieve adhesion to the intermediate layer (II) and to impart mar resistance to the coating system. Specifically, during manufacturing of the laminate, the resin substrate can be heated to a temperature above ambient temperature in order to activate the surface and achieve adhesion to the inner sub-layer, specifically, the surface temperature of the substrate can be elevated to 35° C.-50° C. prior to plasma deposition.

In the various embodiments, the inner sub-layer desirably has a higher fraction of organic functional groups than the outer sub-layer, (e.g., has a refractive index of 1.449 to 1.463), for example, enhancing adhesion. Therefore, the outer sub-layer can contains a lower fraction of organic functional groups which can increase abrasion and mar resistance, which translates to a desirable refractive index in the range of 1.430 to 1.434. The inner sub-layer can further have a nano-indentation hardness of 1.616 to 1.676 GPa, and the outer sub-layer can have a nano-indentation hardness of 2.265 to 2.667.

In some embodiments, the outermost layer (I) has a total thickness of 2.5 micrometers (μm) to 5.0 μm, specifically, 2.7 μm to 3.5 μm.

Desirably, the properties of the outermost layer (I) and intermediate layer (II) are predetermined such that the laminate exhibits:
  a. a delta haze value of less than 2% in the Taber abrasion test of ASTM D1044 using 1,000 cycles;
  b. a pass rate of at least 97% in the adhesion tape test of ASTM D3359, Method B;
  c. a pass rate of at least 97% in the adhesion tape test after water immersion test of ASTM D870 using de-ionized water at 65° C. for 3 days;
  d. a pass rate of at least 97% in the adhesion tape test of ASTM D3359, Method B; and
  e. a pass rate of at least 97% in the adhesion tape test after water immersion test of ASTM D870 using de-ionized water 100° C. for 2 hours.

The laminate has good adhesion when the area of coating sections which are kept unpeeled in the test is at least 97%. In other words, less than 3% of area was removed from the cross cut area. Even more preferably, the properties of the outermost layer (I) and the intermediate layer (II) are such that the laminate exhibits a pass rate for automotive glazing requirements for Item 2 of ANSI Z26.1.

The vinyl copolymer (2-B) can be a copolymer comprising (2-B-i) 5 to 50 percent by weight (wt %) of a vinyl monomer having an organic UV-absorptive group, (2-B-ii) 2 to 30 wt % of a vinyl monomer having reactive group(s) selected from alkoxysilyl, hydroxyl, epoxy, carboxylic acid, and amino groups, and (2-B-iii) 20 to 93 wt % of another monomer capable of copolymerizing with the vinyl monomers, wherein the weight is based upon the total weight of vinyl copolymer (2-B).

Specifically, (2-B-ii) can be a vinyl monomer having reactive group(s) selected from alkoxysilyl, hydroxyl and epoxy groups.

In various embodiments, the composite coating composition (2) can further comprise (2-D) a silicone resin obtained from (co)hydrolytic condensation of member(s) selected from alkoxysilanes having the general formulae (1) to (3), and partial hydrolytic condensates thereof,

$(R^1)_m(R^2)_n Si(OR^3)_{4-m-n}$      (1)

wherein $R^1$ and $R^2$ are each independently hydrogen or a substituted or unsubstituted monovalent hydrocarbon group, $R^1$ and $R^2$ may bond together, $R^3$ is $C_1$-$C_3$ alkyl, m and n are independently 0 or 1, and m+n is 0, 1, or 2;

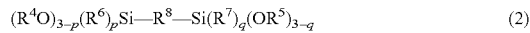

$(R^4O)_{3-p}(R^6)_p Si\!-\!R^8\!-\!Si(R^7)_q(OR^5)_{3-q}$      (2)

wherein $R^4$ and $R^5$ are each independently $C_1$-$C_3$ alkyl, $R^6$ and $R^7$ are each independently hydrogen or a substituted or unsubstituted monovalent hydrocarbon group, $R^8$ is oxygen, phenylene, or substituted or unsubstituted $C_2$-$C_{10}$ alkylene, p and q are independently 0 or 1; and

$X\!-\![(R^{15})Si(R^{16})_y(OR^{17})_{3-y}]_z$      (3)

wherein X is a 1,3,5-trimethylcyclotrisiloxane residue, 1,3,5,7-tetramethylcyclotetrasiloxane residue, or isocyanurate residue, $R^{15}$ is $C_1$-$C_3$ alkylene, $R^{16}$ is hydrogen or a substituted or unsubstituted monovalent hydrocarbon group, $R^{17}$ is $C_1$-$C_3$ alkyl, y is 0 or 1, and z is an integer of 3 to 4.

The silicone resin (2-D) can be obtained from alkoxysilanes of formulae (1), (2) and (3) which are combined such that a ratio of (1)/[(2)+(3)] is from 50/50 to 0/100 in Si-mol %.

Generally, in formula (1), $R^1$ is a monovalent hydrocarbon group substituted with a methyl or UV absorptive group, m=1, n=0, and $R^3$ is methyl; in formula (2), $R^8$ is substituted or unsubstituted $C_2$-$C_8$ alkylene, p=q=0, $R^4$ and $R^5$ are methyl; and in formula (3), X is isocyanurate residue, y=0, $R^{15}$ is propylene, $R^{17}$ is methyl, and z=3.

In a specific embodiment, the silicone resin (2-D) is obtained from hydrolytic condensation of member(s) selected from alkoxysilanes having formulae (2) and (3), and partial hydrolytic condensates thereof.

The silicone resin (2-D) can be obtained from hydrolytic condensation of an alkoxysilane having formula (3) and partial hydrolytic condensate thereof.

In the various embodiments, the composite coating composition (2) can further comprise an organic UV absorber and/or organic UV stabilizer other than (2-B).

Also in the various embodiments, the organic resin substrate comprise polycarbonate (e.g., a molded polycarbonate resin).

Advantageously, the organic resin laminate comprising the herein disclosed multilayer coating system which maintains visible light transparency, exhibits mar resistance and UV shielding property, and further possesses sufficient weather resistance and durability to withstand long-term outdoor exposure can be manufactured in a simple manner. The laminate can be used in various applications such as windows, e.g., windows and windshields in transporting vehicles (such as automobiles and aircraft), and windows in buildings), traffic noise barriers, and the like.

The laminate comprises an organic resin substrate and a multilayer coating system thereon. The multilayer coating system includes an intermediate layer (II) disposed on the substrate and an outermost layer (I) disposed on intermediate layer (II).

Substrate

The substrate used herein may be made of any plastic material (e.g., organic resin substrate), for example, polycarbonate, polystyrene, polyester, acrylic resins, modified acrylic resins, urethane resins, thiourethane resins, polycondensates of halogenated bisphenol A and ethylene glycol, acrylic urethane resins, halogenated aryl-containing acrylic resins, sulfur-containing resins, and combinations comprising at least one of the foregoing plastic materials. These resin substrates can be surface treated, e.g., by conversion treatment, corona discharge treatment, plasma treatment, acid treatment, alkaline treatment, or combinations comprising at least one of the foregoing treatment. Also included are single layer substrates and multiple layer substrates (e.g., laminated substrates comprising a base resin and surface layer(s) formed thereon from a resin of different type from the base resin). For example, the substrate can be a single layer plastic (e.g., optically clear plastic such as polycarbonate) with the multilayer coating system disclosed herein disclosed directly on the single layer substrate (e.g., in physical contact with a surface of the plastic substrate). In another embodiment, the substrate can be multilayer substrate (e.g., laminated or co-extruded) such as a plastic layer co-extruded or laminated with a cap-layer (e.g., an acrylic layer and/or urethane layer), wherein the multilayer coating system is formed on the cap-layer. Examples of multilayer substrates include those comprising a plastic base resin and a surface layer having UV absorbing properties. Specific examples of multilayer substrates include those comprising a polycarbonate base resin and a surface layer of acrylic resin or urethane resin, and those comprising a polyester base resin and a surface layer of acrylic resin formed thereon, wherein the multilayer substrate was prepared by co-extrusion or lamination technique.

Intermediate Layer II

The intermediate layer (II) is a cured film formed from a composite coating composition (2) comprising (2-A) an inorganic oxide nanoparticle, (2-B) a vinyl copolymer, and (2-C) a solvent. Specifically, the composite coating composition (2) comprises:

(2-A) an inorganic oxide nanoparticles;

(2-B) a vinyl copolymer having an organic UV-absorptive group and a reactive group; and (2-C) a solvent.

Examples of the nanoparticles include silica, zinc oxide, titanium oxide, cerium oxide, and combinations comprising at least one of the foregoing. The organic UV-absorptive group can be attached to a main chain. Examples of the reactive group include alkoxysilyl, hydroxyl, epoxy, carboxylic acid, amino groups, and combinations comprising at least one of the foregoing.

Component (2-A) is inorganic oxide nanoparticles, such as silica, zinc oxide, titanium oxide, cerium oxide, and the like. The nanoparticles can be added in an appropriate amount when it is desired to increase the hardness and mar resistance of the coating or enhance the UV absorption capability thereof. The nanoparticles have a particle size (measured along a major axis) of nano-order (i.e., less than 1 micrometer), specifically less than or equal to 500 nanometers (nm), and more specifically, 5 nm to 200 nm. Such nanoparticles can be used in the form of dispersion, e.g., dispersed in a medium such as water and/or organic solvent. For example, a possible silica dispersions are commercially available as Snowtex-O, OS, OL and Methanol Silica Sol from Nissan Chemical Industries, Ltd.

As to the nanoparticles of zinc oxide, titanium oxide, and cerium oxide, those having a photocatalytic degradability (PD) of less than or equal to 25% may be used. The photocatalytic degradability (PD) is determined by adding the oxide nanoparticle dispersion to a methylene blue solution, irradiating black light to the methylene blue solution for 12 hours, measuring the absorbance of the solution at 653 nanometers (nm) before and after the black light irradiation, and calculating a change of absorbance before and after the black light irradiation according to the following formula:

$$PD(\%)=[(A_0-A)/A_0]\times 100$$

wherein $A_0$ is the initial absorbance and A is the absorbance after the black light irradiation.

In general, oxide nanoparticles have a UV-screening function as well as a photocatalyst function. If such oxide nanoparticles are used in a coating composition as a UV-screening agent, the coating can crack due to degradation of the binder by the photocatalyst function. If nanoparticles having a photocatalytic degradability (PD) of less than or equal to 25% are used, then cracking is restrained. These oxide nanoparticles, for example, surface-coated oxide nanoparticles which are obtained by coating surfaces of oxide nanoparticles with an oxide (e.g., silica) or hydroxide. Additionally, or in the alternative, surface treating with a hydrolyzable silane. Examples of the surface-coated oxide nanoparticles include those in which oxide nanoparticles are provided with an oxide coating by using an alkoxide of Al, Si, Zr, or Sn and effecting hydrolysis, and those obtained by using a sodium silicate aqueous solution, and neutralizing the solution for causing oxide or hydroxide to precipitate on surfaces, and optionally, heating the precipitated oxide or hydroxide to enhance crystallinity. Such oxide nanoparticles are commercially available as Nano-Tek® ZNTANB 15 wt %-E16, E34, and RTTDNB 15 wt %-E68, E88 by C.I. Kasei Co., Ltd.

The inorganic oxide nanoparticles (2-A) can be used in an amount of 1 to 50 parts by weight (pbw), specifically, 5 to 40 pbw, per 100 parts by weight of the total solids of (2-A) and (2-B). Less than 1 pbw of (2-A) may lead to low abrasion resistance of the intermediate layer (II). More than 50 pbw of (2-A) may lead to low adhesion to the substrate.

The second component (2-B) of the composite coating composition comprises is a vinyl copolymer having an organic UV-absorptive group and a reactive group. Desirably, the organic UV-absorptive group is attached to the main chain, and more specifically, the reactive group is also attached to the main chain. The vinyl copolymer may be obtained from copolymerization of (2-B-i) a vinyl monomer having an organic UV-absorptive group, (2-B-ii) a vinyl monomer having a reactive group, and (2-B-iii) another monomer capable of copolymerizing with the vinyl monomers.

The vinyl monomer having an organic UV-absorptive group (2-B-i) can be any monomer having an organic UV-absorptive group and a vinyl polymerizable group in a molecule. Examples of the vinyl monomer having an organic UV-absorptive group (2-B-i) include: (meth)acrylic monomers having a UV-absorptive group in a molecule, specifically benzotriazole compounds of the general formula (4)

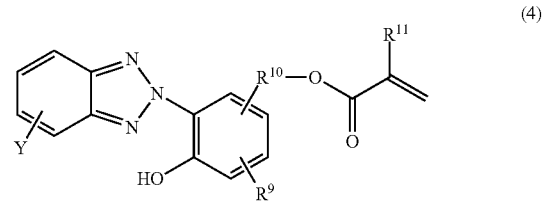

wherein Y is hydrogen or chlorine, $R^9$ is hydrogen, methyl, or $C_4$-$C_8$ tertiary alkyl group, $R^{10}$ is a straight or branched $C_2$-$C_{10}$ alkylene group, and $R^{11}$ is hydrogen or methyl; and benzophenone compounds of the general formula (5)

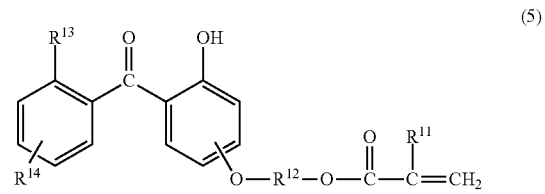

wherein $R^{11}$ is as defined above, $R^{12}$ is $C_2$-$C_{10}$ alkylene group (e.g., a substituted or unsubstituted, straight or branched), $R^{13}$ is hydrogen or hydroxyl, and $R^{14}$ is hydrogen, hydroxyl, or a $C_1$-$C_6$ alkoxy group.

In formula (4), examples of $C_4$-$C_8$ tertiary alkyl groups represented by $R^9$ include: tert-butyl, tert-pentyl, tert-hexyl, tert-heptyl, tert-octyl, and di-tert-octyl. Examples of straight or branched $C_2$-$C_{10}$ alkylene groups represented by $R^{10}$ include ethylene, trimethylene, propylene, tetramethylene, 1,1-dimethyltetramethylene, butylene, octylene, and decylene.

In formula (5), examples of straight or branched $C_2$-$C_{10}$ alkylene groups represented by $R^{12}$ include the same as exemplified for $R^{10}$, and substituted forms of these groups in which some hydrogen atoms are substituted by halogen atoms. Examples of $C_1$-$C_6$ alkoxy groups represented by $R^{14}$ include methoxy, ethoxy, propoxy, and butoxy.

Illustrative non-limiting examples of the benzotriazole compound of formula (4) include: 2-(2'-hydroxy-5'-(meth) acryloxyphenyl)-2H-benzotriazole, 2-(2'-hydroxy-3'-tert-butyl-5'-(meth)acryloxymethylphenyl)-2H-benzotriazole, 2-[2'-hydroxy-3'-tert-butyl-5'-(2-(meth)acryloxyethyl)phenyl]-5-chloro-2H-benzotriazole, 2-[2'-hydroxy-5'-(2-(meth) acryloxyethyl)phenyl]-2H-benzotriazole, and 2-[2'-hydroxy-3'-methyl-5'-(8-(meth)acryloxyoctyl)phenyl]-2H-benzotriazole.

Illustrative non-limiting examples of the benzophenone compound of formula (5) include: 2-hydroxy-4-(2-(meth) acryloxyethoxy)benzophenone, 2-hydroxy-4-(4-(meth)acryloxybutoxy)benzophenone, 2,2'-dihydroxy-4-(2-(meth) acryloxyethoxy)benzophenone, 2,4-dihydroxy-4'-(2-(meth) acryloxyethoxy)benzophenone, 2,2',4-trihydroxy-4'-(2-(meth)acryloxyethoxy)benzophenone, 2-hydroxy-4-(3-(meth)acryloxy-2-hydroxypropoxy)benzophenone, and 2-hydroxy-4-(3-(meth)acryloxy-1-hydroxypropoxy)benzophenone.

Examples of UV absorbing vinyl monomers are benzotriazole compounds of formula (4), with 2-[2'-hydroxy-5'-(2-(meth)acryloxyethyl)phenyl]-2H-benzotriazole being particularly desirable. The UV absorbing vinyl monomers may be used alone or in admixture.

The vinyl monomer having an organic UV absorptive group (2-B-i) can be present in an amount of 5 wt % to 50 wt %, specifically, 5 wt % to 30 wt %, based upon a total weight of the copolymer composition. Less than 5 wt % of vinyl monomer (2-B-i) may lead to insufficient weatherability whereas more than 50 wt % of vinyl monomer (2-B-i) may lead to a coating which is less adherent or displays poor appearance like whitening.

The vinyl monomer having a reactive group (2-B-ii) may be any monomer having one vinyl-polymerizable functional group and at least one reactive group selected from among alkoxysilyl, hydroxyl, epoxy, carboxylic acid, and amino groups in the molecule.

Examples of vinyl-polymerizable functional groups include: $C_1$-$C_{12}$ organic groups containing vinyl, vinyloxy, (meth)acryloxy, and (α-methyl) styryl, as well as combinations comprising at least one of the foregoing, such as vinyl, 5-hexenyl, 9-decenyl, vinyloxymethyl, 3-vinyloxypropyl, and (meth)acryloxy. Generally, (meth)acryloxy is used for reactivity and availability.

Typical of the reactive group-containing vinyl monomer (2-B-ii) include hydroxyl-containing vinyl monomers, examples of which include: 2-hydroxyethyl methacrylate, 2-hydroxypropyl methacrylate, 3-hydroxypropyl methacrylate, 2-hydroxybutyl methacrylate, 4-hydroxybutyl methacrylate, 3-chloro-2-hydroxypropyl methacrylate, poly(ethylene glycol) methacrylate, poly(propylene glycol) methacrylate, poly(ethylene glycol propylene glycol) methacrylate, poly(ethylene glycol tetramethylene glycol) methacrylate, poly(propylene glycol tetramethylene glycol) methacrylate, glycerol methacrylate, polycaprolacton methacrylate, and acrylate forms of the foregoing, hydroxyethyl vinyl ether, hydroxypropyl vinyl ether, hydroxybutyl vinyl ether, diethylene glycol monovinyl ether, and cyclohexene dimethanol divinyl ether. Generally, 2-hydroxyethyl methacrylate, 2-hydroxypropyl methacrylate, 3-hydroxypropyl methacrylate, 2-hydroxybutyl methacrylate, 4-hydroxybutyl methacrylate, and acrylate forms of the foregoing are desirable from the standpoints of availability, ease of handling, crosslinking density, and reactivity.

Also alkoxysilyl-containing vinyl monomers are typical of the reactive group-containing vinyl monomer (2-B-ii). Examples include methacryloxymethyltrimethoxysilane, methacryloxypropyltrimethoxysilane, methacryloxyundecyltrimethoxysilane, methacryloxypropylmethyldimethoxysilane, methacryloxypropyldimethylmethoxysilane, methacryloxypropyltriethoxysilane, acryloxypropyltrimethoxysilane, acryloxypropylmethyldimethoxysilane, acryloxypropyldimethylmethoxysilane, acryloxypropyltriethoxysilane, acryloxymethyltrimethoxysilane, acryloxyundecyltrimethoxysilane, vinyltrimethoxysilane, vinyltriethoxysilane, vinylmethyldimethoxysilane, allyltrimethoxysilane, styryltrimethoxysilane, styrylmethyldimethoxysilane, and styryltriethoxysilane. Of these, methacryloxypropyltrimethoxysilane, ethacryloxypropylmethyldimethoxysilane, methacryloxypropyldimethylmethoxysilane, acryloxypropyltrimethoxysilane, and acryloxypropylmethyldimethoxysilane are desirable from the standpoints of availability, ease of handling, crosslinking density, and reactivity.

Also included in the reactive group-containing vinyl monomer (2-B-ii) are epoxy-containing vinyl monomers, typically glycidyl methacrylate.

Also included in the reactive group-containing vinyl monomer (2-B-ii) are amino-containing vinyl monomers, examples of which include 2-aminoethyl(meth)acrylate, 2-(N-methylamino)ethyl(meth)acrylate, 2-(N,N-dimethylamino)ethyl(meth)acrylate, 2-(N-ethylamino)ethyl(meth)acrylate, 2-(N,N-diethylamino)ethyl(meth)acrylate, 3-(N,N-dimethylamino)propyl(meth)acrylate, and 4-(N,N-dimethylamino)butyl(meth)acrylate. Inter alia, 2-aminoethyl(meth)acrylate is desired for availability and reactivity.

Among the vinyl monomers (2-B-ii), preference is given to alkoxysilyl-containing vinyl monomers, hydroxyl-containing vinyl monomers, and epoxy-containing vinyl monomers.

The vinyl monomer having a reactive group (2-B-ii) can be present in an amount of 2 wt % to 30 wt %, specifically, 3 wt % to 20 wt %, based upon the total weight of the copolymer composition. Less than 2 wt % of vinyl monomer (2-B-ii) may form a vinyl copolymer which is less compatible and reactive with the inorganic oxide nanoparticle (2-A) so that the film may become whitened, and may also lead to formation of an insufficient three-dimensional network by crosslinking between reactive group on vinyl copolymer and surface M-OH in the oxide nanoparticle (M=Si, Zn, Ti, Ce), resulting in a coating which may not be improved in heat resistance and durability. More than 30 wt % of vinyl monomer (2-B-ii) may form a vinyl copolymer which has high polarity and loses adhesion in boiling water. The reactive group-containing vinyl monomer (2-B-ii) may be used alone or in admixture of two or more.

The other monomer (2-B-iii) copolymerizable with the foregoing monomers (2-B-i) and (2-B-ii) is not particularly limited as long as it is copolymerizable. Included in these other monomers (2-B-iii) are: (meth)acrylic monomers having cyclic hindered amine structure, (meth)acrylates, (meth)acrylonitriles, (meth)acrylamides, alkyl vinyl ethers, alkyl vinyl esters, styrene, and derivatives thereof, as well as combinations comprising at least one of the foregoing.

Examples of the (meth)acrylic monomers having cyclic hindered amine structure include: 2,2,6,6-tetramethyl-4-piperidinyl methacrylate and 1,2,2,6,6-pentamethyl-4-piperidinyl methacrylate. These photostabilizers may be used in admixture of two or more.

Examples of the (meth)acrylates and derivatives thereof include:

(meth)acrylates of monohydric alcohols (such as methyl (meth)acrylate, ethyl(meth)acrylate, n-propyl(meth)acrylate, isopropyl(meth)acrylate, n-butyl(meth)acrylate, isobutyl(meth)acrylate, sec-butyl(meth)acrylate, t-butyl(meth)acrylate, n-pentyl(meth)acrylate, isopentyl(meth)acrylate, n-hexyl(meth)acrylate, isohexyl(meth)acrylate, n-heptyl (meth)acrylate, isoheptyl(meth)acrylate, 2-ethylhexyl(meth)acrylate, n-octyl(meth)acrylate, isooctyl(meth)acrylate, n-nonyl(meth)acrylate, isononyl(meth)acrylate, n-decyl (meth)acrylate, isodecyl(meth)acrylate, n-undecyl(meth)acrylate, n-dodecyl(meth)acrylate, lauryl(meth)acrylate, palmityl(meth)acrylate, stearyl(meth)acrylate, cyclohexyl (meth)acrylate, 4-methylcyclohexyl(meth)acrylate, 4-t-butylcyclohexyl(meth)acrylate, isobornyl(meth)acrylate, dicyclopentanyl(meth)acrylate, dicyclopentenyloxyethyl(meth)acrylate, and benzyl(meth)acrylate);

(meth)acrylates of alkoxy(poly)alkylene glycols (such as 2-methoxyethyl(meth)acrylate, 2-methoxypropyl(meth)acrylate, 3-methoxypropyl(meth)acrylate, 2-methoxybutyl (meth)acrylate, 3-methoxybutyl(meth)acrylate, 4-methoxybutyl(meth)acrylate, methoxypolyethylene glycol(meth)acrylate (e.g., 2 to 20 ethylene glycol units), and methoxypolypropylene glycol(meth)acrylate (e.g., 2 to 20 propylene glycol units));

poly(meth)acrylates of polyhydric alcohols (such as ethylene glycol di(meth)acrylate, propylene glycol di(meth)acrylate, butylene glycol di(meth)acrylate, glycerol di(meth)acrylate, glycerol tri(meth)acrylate, pentaerythritol di(meth)acrylate, pentaerythritol tetra(meth)acrylate, 1,4-cyclohexane diol di(meth)acrylate, polyethylene glycol di(meth)acrylate (e.g., 2 to 20 ethylene glycol units), and polypropylene glycol di(meth)acrylate (e.g., 2 to 20 propylene glycol units)); and (poly)esters of non-polymerizable polybasic acids with hydroxyalkyl(meth)acrylates (such as mono[2-(meth)acryloyloxyethyl]succinate, di[2-meth)acryloyloxyethyl]succinate, mono[2-(meth)acryloyloxyethyl]adipate, di[2-(meth)acryloyloxyethyl]adipate, mono[2-(meth)acryloyloxyethyl]phthalate, and di[2-(meth)acryloyloxyethyl]phthalate).

Examples of the (meth)acrylonitrile derivatives include: α-chloroacrylonitrile, α-chloromethylacrylonitrile, α-trifluoromethylacrylonitrile, α-methoxyacrylonitrile, α-ethoxyacrylonitrile, and vinylidene cyanide.

Examples of the (meth)acrylamide derivatives include: N-methyl(meth)acrylamide, N,N-dimethyl(meth)acrylamide, N-ethyl(meth)acrylamide, N,N-diethyl(meth)acrylamide, N-methoxy(meth)acrylamide, N,N-dimethoxy(meth)acrylamide, N-ethoxy(meth)acrylamide, N,N-diethoxy(meth)acrylamide, diacetone(meth)acrylamide, N-methylol(meth)acrylamide, N-(2-hydroxyethyl)(meth)acrylamide, N,N-dimethylaminomethyl(meth)acrylamide, N-(2-dimethylamino)ethyl(meth)acrylamide, N,N'-methylenebis(meth)acrylamide, and N,N'-ethylenebis(meth)acrylamide.

Examples of the alkyl vinyl ether include: methyl vinyl ether, ethyl vinyl ether, butyl vinyl ether, and hexyl vinyl ether. Examples of the alkyl vinyl ester include vinyl formate, vinyl acetate, vinyl acrylate, vinyl butyrate, vinyl caproate, and vinyl stearate. Examples of styrene and its derivatives include styrene, α-methylstyrene, and vinyltoluene.

Of the foregoing monomers, deference is given to the (meth)acrylates, specifically methyl(meth)acrylate, ethyl (meth)acrylate, isopropyl(meth)acrylate, n-butyl(meth)acrylate, isobutyl(meth)acrylate, n-hexyl(meth)acrylate, 2-ethylhexyl(meth)acrylate, isononyl(meth)acrylate, lauryl(meth)acrylate, cyclohexyl(meth)acrylate, 4-methylcyclohexyl(meth)acrylate, 4-t-butylcyclohexyl(meth)acrylate, isobornyl(meth)acrylate, dicyclopentanyl(meth)acrylate, and dicyclopentenyloxyethyl(meth)acrylate.

As with the other copolymerizable monomer (2-B-iii), the foregoing monomers may be used alone or in admixture of two or more.

The other copolymerizable monomer (2-B-iii) can be used in an amount of 20 wt % to 93 wt %, specifically, 50 wt % to 92 wt %, based upon a total weight of the copolymer composition. Too much of monomer (2-B-iii) may lead to insufficient croslinking between the resulting vinyl copolymer and the inorganic oxide nanoparticle (2-A), thereby resulting in a coating which may not be improved in heat resistance, durability or weatherability.

The vinyl copolymer (2-B) can be readily prepared, for example, from the vinyl monomer having an organic UV absorptive group (2-B-i), the vinyl monomer having a reactive group (2-B-ii), and the other copolymerizable monomer (2-B-iii), by dissolving the monomers in a solvent, adding a radical polymerization initiator (such as peroxide(s) (such as dicumyl peroxide and benzoyl peroxide) and/or azo compounds (e.g., azobisisobutyronitrile)) to the solution, and heating the solution at a temperature of 50° C. to 150° C., especially 70° C. to 120° C., e.g., for 1 to 10 hours, especially 3 to 8 hours.

The vinyl copolymer desirably has a weight average molecular weight (Mw) of 1,000 to 300,000, specifically, 5,000 to 250,000, as measured by GPC versus polystyrene standards. A copolymer having too high Mw may have too high a viscosity and thus be difficult to synthesize or handle. A copolymer having too low Mw may lead to a coating which displays defective appearance like whitening or lacks adhesion, durability or weatherability.

The vinyl copolymer (2-B) can be used in an amount of 20 pbw to 99 pbw, specifically, 25 to 95 pbw, per 100 parts by weight of the total solids of (2-A) and (2-B). Less than 20 pbw of (2-B) may lead to low adhesion to the substrate and low weather resistance. More than 99 pbw of (2-B) may lead to low abrasion resistance of the intermediate layer (II).

Component (2-C) is a solvent. The solvent is not particularly limited as long as components (2-A) and (2-B) are dissolvable or dispersible therein. A solvent mainly comprising a highly polar organic solvent is desirable. Examples of solvents include: alcohols (such as methanol, ethanol, isopropyl alcohol, n-butanol, isobutanol, t-butanol, and diacetone alcohol); ketones (such as methyl propyl ketone, diethyl ketone, methyl isobutyl ketone, cyclohexanone, and diacetone alcohol); ethers (such as dipropyl ether, dibutyl ether, anisole, dioxane, ethylene glycol monoethyl ether, ethylene glycol monobutyl ether, propylene glycol monomethyl ether, and propylene glycol monomethyl ether acetate); and esters (such as ethyl acetate, propyl acetate, butyl acetate, and cyclohexyl acetate); as well as combinations comprising at least one of the foregoing. The solvents may be used alone or in admixture.

Component (2-C) can be added in such an amount that the composite coating composition (2) may have a solids concentration of 1 wt % to 30 wt %, specifically, 5 wt % to 25 wt %, based upon the total weight of the coating composition. Outside the range, a coating obtained by applying the composition and curing may be defective. A concentration below the range may lead to a coating which is likely to sag, wrinkle or mottle, failing to provide the desired hardness and mar resistance. A concentration beyond the range may lead to a coating which is prone to brushing, whitening, or cracking.

The composite coating composition (2) may further comprise (2-D) a silicone resin obtained from (co)hydrolytic condensation of member selected from alkoxysilanes having formulae (1) to (3) and partial hydrolytic condensates thereof. The first alkoxysilane or partial hydrolytic condensate thereof has the formula (1):

$$(R^1)_m(R^2)_n Si(OR^3)_{4-m-n} \quad (1)$$

wherein $R^1$ and $R^2$ are each independently hydrogen or a substituted or unsubstituted monovalent hydrocarbon group, $R^1$ and $R^2$ may bond together, $R^3$ is $C_1$-$C_3$ alkyl, m and n are independently 0 or 1, and m+n is 0, 1 or 2.

In formula (1), $R^1$ and $R^2$ can each be independently selected from hydrogen and substituted or unsubstituted monovalent hydrocarbon groups, specifically having 1 to 30 carbon atoms, more specifically, having 1 to 20 carbon atoms, for example, hydrogen; alkyl groups (such as methyl, ethyl, propyl, butyl, pentyl, hexyl, heptyl and octyl); cycloalkyl groups (such as cyclopentyl and cyclohexyl); alkenyl groups (such as vinyl and allyl); aryl groups (such as phenyl); halo-substituted hydrocarbon groups (such as chloromethyl, γ-chloropropyl, and 3,3,3-trifluoropropyl); and hydrocarbon groups having (meth)acryloxy, epoxy, mercapto, amino, isocyanato or UV-absorptive group substituted thereon (such as γ-methacryloxypropyl, γ-glycidoxypropyl, 3,4-epoxycyclohexylethyl, γ-mercaptopropyl, γ-aminopropyl, and γ-isocyanatopropyl, and hydroxybenzophenonoxypropyl); as well as combinations comprising at least one of the foregoing. Of these, alkyl groups and UV-absorptive group-substituted hydrocarbon groups are desirable for the application where mar resistance and weatherability are paramount, and epoxy and (meth)acryloxy-substituted hydrocarbon groups are desirable where toughness and dyeability are paramount.

$R^3$ can be selected from $C_1$-$C_3$ alkyl groups, for example, methyl, ethyl, n-propyl, and isopropyl, as well as combinations comprising at least one of the foregoing. Of these, methyl and ethyl are desirable because the alkoxysilane is highly reactive in hydrolytic condensation and the alcohol $R^3OH$ formed can be readily distilled off due to a high vapor pressure.

The alkoxysilane of formula (1) wherein m=0 and n=0 is a tetraalkoxysilane of the formula: $Si(OR^3)_4$ or a partial hydrolytic condensate thereof. Examples of tetraalkoxysilane and partial hydrolytic condensate thereof include tetramethoxysilane, tetraethoxysilane, tetraisopropoxysilane, tetrabutoxysilane; partial hydrolytic condensates of tetramethoxysilane, which are commercially available under the trade name of M Silicate 51 from Tama Chemicals Co., Ltd., MSI51 from Colcoat Co., Ltd., and MS51 and MS56 from Mitsubishi Chemical Co., Ltd.; partial hydrolytic condensates of tetraethoxysilane, which are commercially available under the trade name of Silicate 35 and Silicate 45 from Tama Chemicals Co., Ltd., ESI40 and ESI48 from Colcoat Co., Ltd.; and partial co-hydrolytic condensates of tetramethoxysilane and tetraethoxysilane, which are commercially available under the trade name of FR-3 from Tama Chemicals Co., Ltd. and EMSi48 from Colcoat Co., Ltd.

The alkoxysilane of formula (1) wherein m=1 and n=0 or m=0 and n=1 is a trialkoxysilane of the formula: $R^1Si(OR^3)_3$ or $R^2Si(OR^3)_3$ or a partial hydrolytic condensate thereof. Examples of trialkoxysilane and partial hydrolytic condensate thereof include hydrogentrimethoxysilane, hydrogentriethoxysilane, methyltrimethoxysilane, methyltriethoxysilane, methyltriisopropoxysilane, ethyltrimethoxysilane, ethyltriethoxysilane, ethyltriisopropoxysilane, propyltrimethoxysilane, propyltriethoxysilane, propyltriisopropoxysilane, phenyltrimethoxysilane, vinyltrimethoxysilane, allyltrimethoxysilane, γ-methacryloxypropyltrimethoxysilane, γ-methacryloxypropyltriethoxysilane, γ-acryloxypropyltrimethoxysilane, γ-glycidoxypropyltrimethoxysilane, γ-glycidoxypropyltriethoxysilane, β(3,4-epoxycyclohexyl) ethyltrimethoxysilane, γ-chloropropyltrimethoxysilane, 3,3,3-trifluoropropyltrimethoxysilane, 3,3,3-trifluoropropyltriethoxysilane, perfluorooctylethyltrimethoxysilane, γ-mercaptopropyltrimethoxysilane, γ-aminopropyltrimethoxysilane, γ-aminopropyltriethoxysilane, N-(2-aminoethyl)aminopropyltrimethoxysilane, γ-isocyanatopropyltrimethoxysilane, γ-isocyanatopropyltriethoxysilane, hydroxybenzophenonoxypropyltrimethoxysilane; partial hydrolytic condensates of methyltrimethoxysilane, which are commercially available as KC-89S and X-40-9220 from Shin-Etsu Chemical Co., Ltd.; and partial hydrolytic condensates of methyltrimethoxysilane and γ-glycidoxypropyltrimethoxysilane, which are commercially available as X-41-1056 from Shin-Etsu Chemical Co., Ltd.

The alkoxysilane of formula (1) wherein m=1 and n=1 is a dialkoxysilane of the formula: $(R^1)(R^2)Si(OR^3)_2$ or a partial hydrolytic condensate thereof. Examples of dialkoxysilane and partial hydrolytic condensate thereof include methylhydrogendimethoxysilane, methylhydrogendiethoxysilane, imethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, vinylmethyldimethoxysilane, γ-glycidoxypropylmethyldimethoxysilane, γ-glycidoxypropylmethyldiethoxysilane, β(3,4-epoxycyclohexyl)ethylmethyldimethoxysilane, γ-methacryloxypropylmethyldimethoxysilane, γ-methacryloxypropylmethyldiethoxysilane, γ-mercaptopropylmethyldimethoxysilane, γ-aminopropylmethyldiethoxysilane, N-(2-aminoethyl)aminopropylmethyldimethoxysilane, hydroxybenzophenonoxypropylmethyldimethoxysilane, and partial hydrolytic condensates thereof.

Of the foregoing examples of alkoxysilane having formula (1), methyltrimethoxysilane, and partial hydrolytic condensates of methyltrimethoxysilane (e.g., commercially available as KC-89S and X-40-9220 from Shin-Etsu Chemical Co., Ltd.), and hydroxybenzophenonoxypropyltrimethoxysilane, are desirable.

The second alkoxysilane or partial hydrolytic condensate thereof has the formula (2):

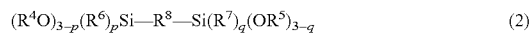

$$(R^4O)_{3-p}(R^6)_pSi—R^8—Si(R^7)_q(OR^5)_{3-q} \qquad (2)$$

wherein $R^4$ and $R^5$ are each independently $C_1$-$C_3$ alkyl, $R^6$ and $R^7$ are each independently hydrogen or a substituted or unsubstituted monovalent hydrocarbon group, $R^8$ is oxygen, phenylene, or substituted or unsubstituted $C_2$-$C_{10}$ alkylene, p and q are independently 0 or 1.

In formula (2), $R^4$ and $R^5$ are selected from $C_1$-$C_3$ alkyl groups, for example, methyl, ethyl, n-propyl, and isopropyl. Of these, methyl and ethyl are preferred because the alkoxysilane is highly reactive in hydrolytic condensation and the alcohol $R^4OH$ or $R^5OH$ formed can be readily distilled off due to a high vapor pressure.

$R^6$ and $R^7$ are each independently selected from hydrogen and substituted or unsubstituted monovalent hydrocarbon groups, e.g., having 1 to 12 carbon atoms, specifically having 1 to 8 carbon atoms. For example, $R^6$ and $R^7$ can each independently be: hydrogen; alkyl groups (such as methyl, ethyl, propyl, butyl, pentyl, hexyl, heptyl and octyl); cycloalkyl groups (such as cyclopentyl and cyclohexyl); alkenyl groups (such as vinyl and allyl); aryl groups (such as phenyl); halo-substituted hydrocarbon groups (such as chloromethyl, γ-chloropropyl, and 3,3,3-trifluoropropyl); and (meth)acryloxy, epoxy, mercapto, amino or isocyanato-substituted hydrocarbon groups (such as γ-methacryloxypropyl, γ-glycidoxypropyl, 3,4-epoxycyclohexylethyl, γ-mercaptopropyl, aminopropyl, and γ-isocyanatopropyl); as well as combinations comprising at least one of the foregoing. Of these, alkyl groups (specifically, methyl) are desirable for the application where mar resistance and weatherability are paramount.

$R^8$ is an oxygen atom, phenylene group, or substituted or unsubstituted $C_2$-$C_{10}$ alkylene group. Of divalent alkylene groups, unsubstituted or halo-substituted $C_2$-$C_{10}$ alkylene groups are desirable. For example, $R^8$ can be: ethylene, 1,3-propylene, 1,4-butylene, 1,6-hexylene, 1,8-octylene, 3,3,4,4,5,5,6,6-octafluoro-1,8-octylene, 1,10-decylene, and 3,3,4,4,5,5,6,6,7,7,8,8-dodecafluoro-1,10-decylene. Of these, unsubstituted or halo-substituted $C_2$-$C_{10}$ alkylene groups, specifically ethylene, 1,6-hexylene, 3,3,4,4,5,5,6,6-octafluoro-1,8-octylene, 1,10-decylene, and 3,3,4,4,5,5,6,6, 7,7,8,8-dodecafluoro-1,10-decylene are desirable for the application where mar resistance and weatherability are paramount.

The alkoxysilane of formula (2) can typically be a bisalkoxysilane or partial hydrolytic condensate thereof. Examples include 1,2-ethylenebis(trimethoxysilane), 1,2-ethylenebis(methyldimethoxysilane), 1,6-hexylenebis(trimethoxysilane), 1,6-hexylenebis(methyldimethoxysilane), 3,3,4,4,5,5,6,6-octafluoro-1,8-octylenebis(trimethoxysilane), and 3,3,4,4,5,5,6,6-octafluoro-1,8-octylenebis(methyldimethoxysilane).

The third alkoxysilane or partial hydrolytic condensate thereof has the formula (3):

wherein X is a 1,3,5-trimethylcyclotrisiloxane residue, 1,3,5,7-tetramethylcyclotetrasiloxane residue or isocyanurate residue, $R^{15}$ is $C_1$-$C_3$ alkylene, $R^{16}$ is hydrogen or a substituted or unsubstituted monovalent hydrocarbon group, $R^{17}$ is $C_1$-$C_3$ alkyl, y is 0 or 1, and z is an integer of 3 to 4.

In formula (3), X can be a 1,3,5-trimethylcyclotrisiloxane residue having the formula (i), a 1,3,5,7-tetramethylcyclotetrasiloxane residue having the formula (ii), or an isocyanurate residue having the formula (iii), as shown below. Of these, the isocyanurate residue is desirable.

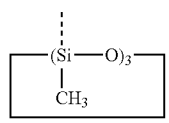

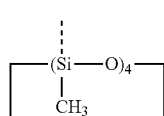

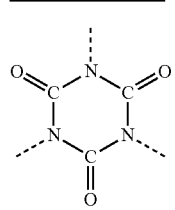

Herein the broken line denotes a valence bond.

$R^{15}$ can be $C_1$-$C_3$ alkylene, examples of which include methylene, ethylene, 1,2-propylene, and 1,3-propylene, with 1,3-propylene being desirable. $R^{16}$ is as exemplified for $R^6$ and $R^7$ in formula (2). $R^{17}$ is as exemplified for $R^4$ and $R^5$ in formula (2).

Examples of the alkoxysilane having formula (3) include 1,3,5-trimethyl-1,3,5-tris(3-trimethoxysilylpropyl)cyclotrisiloxane, 1,3,5-trimethyl-1,3,5-tris(3-triethoxysilylpropyl)cyclotrisiloxane, 1,3,5,7-tetramethyl-1,3,5,7-tetrakis(3-trimethoxysilylpropyl)cyclotetrasiloxane, 1,3,5,7-tetramethyl-1,3,5,7-tetrakis(3-triethoxysilylpropyl)cyclotetrasiloxane, tris(3-trimethoxysilylpropyl)isocyanurate, and tris(3-triethoxysilylpropyl)isocyanurate.

Specifically, in formula (1), $R^1$ can be a monovalent hydrocarbon group substituted with a methyl or UV absorptive group, m=1, n=0, and $R^3$ is methyl; in formula (2), $R^8$ is substituted or unsubstituted $C_2$-$C_8$ alkylene, p=q=0, $R^4$ and $R^5$ are methyl; and in formula (3), X is isocyanurate residue, y=0, $R^{15}$ is propylene, $R^{17}$ is methyl, and z=3.

The silicone resin as component (2-D) may be prepared using alkoxysilanes and partial hydrolytic condensates thereof having formulae (1) to (3) in any desired proportion. For the purpose of improving mar resistance and crack resistance, it is desirable to combine the alkoxysilanes such that a ratio of (1)/[(2)+(3)] can range from 50/50 to 0/100 in silicon mole percent (Si-mol %), and specifically 30/70 to 0/100 in Si-mol %. If the total of main components (2) and (3) is less than 50 Si-mol %, the resulting resin may have a lower crosslinking density and less curability, tending to form a cured film with a lower hardness.

It is noted that Si-mol % is a percentage based on the total Si moles, and the Si mole means that in the case of a monomer, its molecular weight is 1 mole, and in the case of a dimer, its average molecular weight divided by 2 is 1 mole.

The silicone resin as component (2-D) may be prepared through (co)hydrolytic condensation of alkoxysilanes having formulae (1) to (3) by a well-known method. For example, an alkoxysilane or partial hydrolytic condensate thereof having formulae (1) to (3) or a mixture thereof is (co)hydrolyzed in water (e.g., at a pH of 1 to 7.5, specifically, a pH of 2 to 7). At this point, metal oxide nanoparticles dispersed in water such as silica sol may be used. A catalyst may be added to the system for adjusting its pH to the described range and to promote hydrolysis. Examples of such catalysts include: organic acids and inorganic acids (such as hydrogen fluoride, hydrochloric acid, nitric acid, formic acid, acetic acid, propionic acid, oxalic acid, citric acid, maleic acid, benzoic acid, malonic acid, glutaric acid, glycolic acid, methanesulfonic acid, and toluenesulfonic acid), solid acid catalysts (such as cation exchange resins having carboxylic or sulfonic acid groups on the surface), and water-dispersed metal oxide nanoparticles (such as acidic water-dispersed silica sol). Alternatively, a dispersion of metal oxide nanoparticles in water or organic solvent such as silica sol may be co-present upon hydrolysis.

In this hydrolysis, water may be used in an amount of 20 to 3,000 pbw per 100 parts by weight of the total of alkoxysilanes having formulae (1) to (3) and partial hydrolytic condensates thereof. An excess of water may lower system efficiency and in a final coating composition, residual water can adversely affect coating operation and drying. Water can be used in an amount of 50 pbw to less than 150 pbw for the purpose of improving storage stability, mar resistance, and crack resistance. With a smaller amount of water, the silicone resin may fail to reach a weight average molecular weight (Mw) in the optimum range (defined later), as measured by GPC versus polystyrene standards. With an excess of water, the resulting silicone resin may fail to reach the optimum range to maintain a coating crack resistant.

Hydrolysis may be effected by adding dropwise or pouring water to the alkoxysilane or partial hydrolytic condensate, or inversely by adding dropwise or pouring the alkoxysilane or partial hydrolytic condensate to water. The reaction system may contain an organic solvent. However, the absence of organic solvent is beneficial because there is a tendency that as the reaction system contains more organic solvent, the resulting silicone resin has a lower weight average molecular weight as measured by GPC versus polystyrene standards.

To produce the silicone resin (2-D), the hydrolysis may be followed by heating or distillation of alcohol byproduct. Following hydrolysis, the liquid may be maintained at room temperature or heated at a temperature of not higher than 100° C. A temperature higher than 100° C. may cause gelation. Condensation may be promoted by distilling off the alcohol formed by hydrolysis at a temperature of at least 80° C. and atmospheric or subatmospheric pressure. Also for the purpose of promoting condensation, condensation catalysts such as basic compounds, acidic compounds or metal chelates may be added. Prior to or during the condensation step, an organic solvent may be added for the purpose of adjusting the progress of condensation or the concentration, or a dispersion of metal oxide nanoparticles in water or organic solvent such as silica sol or a (surface-coated) composite oxide nanoparticle dispersion may also be added. For the reason that a silicone resin generally builds up its molecular weight and reduces its solubility in water or alcohol formed as condensation proceeds, the organic solvent added herein should preferably be one having a boiling point of at least 80° C. and a relatively high polarity in which the silicone resin is fully dissolvable. Examples of the organic solvent include alcohols (such as isopropyl alcohol, n-butanol, isobutanol, t-butanol, and diacetone alcohol); ketones (such as methyl propyl ketone, diethyl ketone, methyl isobutyl ketone, cyclohexanone, and diacetone alcohol); ethers (such as dipropyl ether, dibutyl ether, anisole, dioxane, ethylene glycol monoethyl ether, ethylene glycol monobutyl ether, propylene glycol monomethyl ether, and propylene glycol monomethyl ether acetate); and esters (such as propyl acetate, butyl acetate, and cyclohexyl acetate); as well as combinations comprising at least one of the foregoing.

The silicone resin resulting from hydrolytic condensation can have a weight average molecular weight (Mw) of at least 1,500, specifically, 1,500 to 50,000, and more specifically, 1,700 to 20,000, as measured by GPC versus polystyrene standards. With a Mw below the range, a coating tends to be less tough and prone to cracking. On the other hand, a silicone resin with too high a Mw tends to have a low hardness and the resin in a coating undergoes phase separation, incurring film whitening.

The composite coating composition (2) may contain water. Water may be added to the composition from without, or residual water from (co)hydrolytic condensation present in silicone resin (2-D) may be used as such. The water added serve to promote, in part, the crosslinking reaction of inorganic oxide nanoparticle (2-A) with reactive group-containing vinyl copolymer (2-B), facilitating formation of the composite reaction product of components (2-A) and (2-B). Typically this composite product is formed when the composite coating composition is cured. The inclusion of part of the composite product in the composition can be beneficial in further promoting cure.

Although the water used herein is not particularly limited, acidic or neutral water is desirable. While an acidic substance may be added for rendering water acidic, desirably, it is a substance which will not be left in the coating when the coating composition is cured. If such a substance is left in the cured coating, the coating may not have the desired adhesion or crack resistance. Organic acids are particularly desirable, such as organic carboxylic acids (e.g., formic acid, acetic acid, propionic acid and oxalic acid). Inter alia, formic acid and acetic acid are desirable for volatility with no residues in the coating.

The amount of water used is not particularly limited as long as reactive group-containing vinyl copolymer (2-B) is compatible and uniformity is maintained. Specifically water can be used in an amount of less than 5 moles per mole of the reactive group in vinyl copolymer (2-B). Specifically, the amount of water can be 0.1 mole to less than 5 moles, and even more specifically from 0.3 to 3 moles on the same basis. An excess amount of water may detract from the storage stability of the composition, which may undergo a viscosity buildup or gelation during storage or use.

The composite coating composition (2) can further comprise curing catalyst(s). The curing catalyst serves to promote condensation reaction of condensable groups such as surface M-OH groups in oxide nanoparticle (2-A). Examples of catalysts include: basic compounds (such as lithium hydroxide, sodium hydroxide, potassium hydroxide, sodium methylate, sodium propionate, potassium propionate, sodium acetate, potassium acetate, sodium formate, potassium formate, trimethylbenzylammonium hydroxide, tetramethylammonium hydroxide, tetramethylammonium acetate, n-hexylamine, tributylamine, diazabicycloundecene (DBU), and dicyandiamide); metal-containing compounds (such as tetraisopropyl titanate, tetrabutyl titanate, acetylacetonatotitanium, aluminum triisobutoxide, aluminum triisopropoxide, tris(acetylacetonato)aluminum, aluminum diisopropoxy(ethyl acetoacetate), aluminum perchlorate, aluminum chloride, cobalt octylate, (acetylacetonato)cobalt, (acetylacetonato)iron, (acetylacetonato)tin, dibutyltin octylate, and dibutyltin laurate); and acidic compounds (such as p-toluenesulfonic acid and richloroacetic acid); as well as combinations comprising at least one of the foregoing. Of these catalysts, preference is given to sodium propionate, sodium acetate, sodium formate, trimethylbenzylammonium hydroxide, tetramethylammonium hydroxide, tris(acetylacetonato)aluminum, and aluminum diisopropoxy(ethyl acetoacetate).

Insofar as curing catalysts is compounded in an effective amount to cure the component (2-A) and (2-B), the amount of the catalyst is not particularly limited. Specifically the curing catalyst can be used in an amount of 0.0001 wt % to 30 wt %, more specifically, 0.001 wt % to 10 wt %, based on the weight of solids of composite coating composition (2). Less than 0.0001 wt % of the catalyst may lead to under-cure and low hardness. More than 30 wt % of the catalyst may lead to a coating which is prone to cracking and poorly water resistant.

If desired, another organic UV absorber and/or UV stabilizer, different than component (2-B), can also be added to the composite coating composition (2), e.g., to prevent the substrate from yellowing or surface degradation. Desirably, the organic UV absorber and/or UV stabilizer is compatible with the composite coating composition (2). Examples of the other organic UV absorbers include derivatives of compounds having hydroxybenzophenone, benzotriazole, cyanoacrylate and triazine as a main skeleton. Also included are polymers such as vinyl polymers having the UV absorber incorporated in a side chain and copolymers thereof with another vinyl monomer, and silyl-modified organic UV absorbers, and (partial) hydrolytic condensates thereof. UV absorbers can include: 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3'-diphenyl acrylate, 2-(2-hydroxy-4-hexyloxyphenyl)-4,6-diphenyltriazine, (co)polymers of 2-hydroxy-4-(2-acryloxyethoxy)benzophenone, (co)polymers of 2-(2'-hydroxy-5'-methacryloxyethylphenyl)-2H-benzotriazole, the reaction product of 2,4-dihydroxybenzophenone with 7-glycidoxypropyltrimethoxysilane, the reaction product of 2,2',4,4'-tetrahydroxybenzophenone with 7-glycidoxypropyltrimethoxysilane, and (partial) hydrolyzates thereof. These organic UV absorbers may be used alone or in admixture.

The UV absorber can be compounded in an amount of 0 to 100 pbw, specifically, 0.3 to 100 pbw, more specifically, 0.3 to 30 pbw, based on 100 parts of the solids in the composite coating composition (2).

The UV stabilizer can be compounds having at least one cyclic hindered amine structure in a molecule, which are compatible with the composite coating composition (2) and have a low volatility. Examples of UV stabilizers include: 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)pyrrolidine-2,5-dione, N-acetyl-3-dodecyl-1-(2,2,6,6-tetramethyl-4-piperidinyl)pyrrolidine-2,5-dione, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, the condensate of 1,2,3,4-butanetetracarboxylic acid, 2,2,6,6-tetramethyl-4-piperidinol and tridecanol, 8-acetyl-3-dodecyl-7,7,9,9-tetramethyl-1,3,8-triazaspiro[4,5]decane-2,4-dione, the condensate of 1,2,3,4-butanetetracarboxylic acid, 1,2,2,6,6-pentamethyl-4-piperidinol and β,β,β,β'-tetramethyl-3,9-(2,4,8,10-tetraoxaspiro[5,5]undecane)diethanol, and the condensate of 1,2,3,4-butanetetracarboxylic acid, 1,2,2,6,6-pentamethyl-4-piperidinol and β,β,β,β'-tetramethyl-3,9-(2,4,8,10-tetraoxaspiro[5,5]undecane)diethanol. Also possible are photostabilizers which are modified by silylation for the purpose of anchoring the photostabilizers as described in JP-B S61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, 2,2,6,6-tetramethylpiperidino-4-propylmethyldiethoxysilane, and (partial) hydrolyzates thereof. These photostabilizers may be used in admixture of two or more.

The UV stabilizer can be compounded in an amount of 0 to 10 pbw, specifically, 0.03 pbw to 10 pbw, more specifically, 0.03 pbw to 7.5 pbw, based on 100 parts of the solids of composite coating composition (2).

If desired, additives may be added to the composite coating composition (2) insofar as this does not adversely affect the desired laminate or properties thereof. Possible additives include: pH adjustors, leveling agents, dehydrating agents, thickeners, pigments, dyes, metal powder, antioxidants, heat ray reflecting/absorbing agents, plasticizers, antistatic agents, anti-staining agents, and water repellents, as well as combinations comprising at least one of the foregoing.

For enhanced storage stability, the composite coating composition (2) may be adjusted to a pH of 2 to 7, specifically, a pH of 3 to 6. Since a pH value outside the range may lessen storage stability, a pH adjustor may be added so that the pH falls in the range. For a composite coating composition having a pH value outside the range, if the pH is more acidic than the range, a basic compound (e.g., such as ammonia or ethylene diamine) may be added for pH adjustment. If the pH is more basic than the range, an acidic compound (e.g., such as hydrochloric acid, nitric acid, acetic acid or citric acid) may be added for pH adjustment. The pH adjustment method is not particularly limited.

The composite coating composition (2) may be applied to the substrate by any ordinary coating techniques. Examples of coating techniques include brush coating, spray coating, dipping, flow coating, roll coating, curtain coating, spin coating, and knife coating.

After the composite coating composition (2) is applied, the coating can be air dried or heated to form a cured layer as intermediate layer (II). The curing temperature and time are not particularly limited although the coating is generally heated at a temperature below the heat resistant temperature of the substrate for 10 minutes to 2 hours. Specifically, the coating can be heated to a temperature of 80° C. to 135° C. for 30 minutes to 2 hours.

The thickness of the cured film as intermediate layer (II) is not particularly limited and may be selected as appropriate for a particular application. The cured film generally has a thickness of 0.1 micrometers (μm) to 50 μm, specifically, 3 μm to 25 μm, e.g., to ensure that the cured film has hardness, mar resistance, long-term stable adhesion, and long-term crack resistance.

For the purpose of smoothening a coating, fluorochemical or silicone surfactants such as Fluorad FC-4430 (3M) and KP-341 (Shin-Etsu Chemical Co., Ltd.) may be added in effective amounts. For the purpose of promoting cure of a coating, crosslinking cure catalysts such as Neostann U-810 (Nitto Kasei Co., Ltd.), B-7 (Nippon Soda Co., Ltd.) and Orgatix ZA-60 and TC-200 (Matsumoto Fine Chemical Co., Ltd.) may be added in catalytic amounts.

The intermediate layer (II) which is a cured coating of composite coating composition (2) can be overlaid with an outermost layer (I) to be described below. The resulting laminate exhibits a high level of weatherability, e.g., due to the effect of UV absorptive group of component (2-B) in intermediate layer (II).

Outermost Layer I

In an embodiment, the outermost layer can be deposited by the low-pressure expanding thermal plasma (ETP) deposition process. In the ETP process, a plasma is developed by passing a noble gas (such as Ar or He) through a direct current (DC) arc generator for ionization. The plasma expands in a chamber (e.g., low pressure chamber) into which a gasified organosilicon compound is admitted. The plasma species reacts with the organosilicon gas to create a dissociated molecule. It is a precursor to the deposited film. An oxidizing gas may be added to the chamber for reaction with the dissociated reactant molecule.

The coating chamber adapted for continuous double-side coating process includes a heating station and two coating stations for depositing inner and outer sub-layers. Each coating station includes DC plasma arc generators arrayed on opposite sides and provides coating over the entire window surface. The deposition rate can be in a range of 200 nanometers per minute (nm/min) to 10,000 nm/min. The number of plasma arc generators in a row may be scaled up in order to provide full coating over a large area substrate (e.g., a window).

Typically, the inner sub-layer has a refractive index in the range of 1.449 to 1.463 and the outer sub-layer has a refractive index in the range of 1.430 to 1.434. Also, the inner sub-layer can have a nano-indentation hardness in the range of 1.616 gigaPascals (GPa) to 1.676 GPa and the outer sub-layer can have a nano-indentation hardness in the range of 2.265 to 2.267 GPa. Typically, the outermost layer (I) has a total thickness of 2.5 to 5.0 μm, specifically, 2.7 to 3.5 μm.

The laminate disclosed herein is characterized by mar resistance. An index of mar resistance is a delta haze value (ΔHz) in the Taber abrasion test. Specifically, a ΔHz value is determined according to ASTM D1044 by mounting a Taber abrasion tester with abrasion wheels CS-10F, measuring the haze after 1,000 turns under a load of 500 grams (g), and calculating a difference (ΔHz) between haze values before and after the test. The laminate can have a ΔHz of less than or equal to 5.0%, specifically less than or equal to 3.0%, and even more specifically, less than or equal to 2.0%.

The laminate is also characterized by adhesion. An index of adhesion is given by the adhesion test of ASTM D870 after immersion in de-ionized water at 65° C. for 3 days using tape test method of ASTM D3359 Method B and by the adhesion test of ASTM D870 after immersion in de-ionized water at 100° C. for 2 hours using tape test method of ASTM D3359 Method B. The laminate has good adhesion when the area of coating sections which are kept unpeeled in the test is greater than or equal to 97%, in other words, less than 3% of area removed from the cross cut area.

The laminate is further characterized by weather resistance. An index of weather resistance is given by a weathering test to see whether or not a coating is kept intact, that is, whether or not a coating is cracked or peeled, and also whether or not a laminate is yellowed. To examine the development of cracks in a coating, the weathering test is carried out by using Eyesuper UV tester W-151 (Iwasaki Electric Co., Ltd.), and repeating cycles comprising: a) a black panel temperature of 63° C., humidity of 50% RH, illuminance of 50 milliWatts per square centimeter (mW/$cm^2$), raining intervals of 10 seconds per hour (sec/hr) for 5 hours; and b) black panel temperature 30° C., humidity 95% RH for one hour. Those samples whose coating undergoes neither cracking nor peeling or whose substrate undergoes no yellowing after 40 cycles are regarded as passing the test.

EXAMPLE

Synthesis Examples, Examples and Comparative Examples are given below by way of illustration and not by way of limitation. Unless otherwise stated, all parts and percents are by weight. The viscosity is as measured at 25° C. according to JIS Z8803. Mw denotes a weight average molecular weight as determined by gel permeation chromatography (GPC) using polystyrene standards.

Inorganic Oxide Nanoparticle (2-A)

Component (2-A) used is a dispersion as shown below.
(2-A-a): PMA-ST by Nissan Chemical Industries, Ltd. (a silica sol dispersed in a propylene glycol monomethyl ether acetate, solids concentration: 30 wt %, average particle size: 15-20 nm)
(2-A-b): ZNTANB 15 wt %-E34 by C.I. Kasei Co., Ltd. (a dispersion obtained by applying silica to zinc oxide nanoparticles prepared by DC arc plasma method, and dispersing them in an alcohol mixture with the aid of a dispersant, solids concentration: 15%, average particle size (volume average particle size $D_{50}$): 99 nm)

Photocatalytic degradability (PD) of (2-A-b) was 15.3%. Measurement of photocatalytic activity of oxide nanoparticle dispersion was followed. An amount of the zinc oxide nanoparticle dispersion (2-A-b) to provide 0.15 g of oxide nanoparticle solids was added to 20 g of a methylene blue solution in water/methanol (1:1 weight ratio) having a methylene blue concentration of 0.01 millimoles per liter (mmol/L). The solution was stirred in the dark for 30 minutes, and then irradiated with black light of 15 watts (W) for 12 hours. Thereafter, the solution was centrifuged at 3,000 revolutions per minute (rpm) for 15 minutes to collect the supernatant, and the absorbance of methylene blue at 653 nm was measured by a UV/visible spectrophotometer. A photocatalytic degradability (PD) was computed from the absorbance before and after the black light irradiation according to the following formula:

PD(%)=[($A_0$-A)/$A_0$]×100 wherein $A_0$ is the initial absorbance and A is the absorbance after the black light irradiation.

Synthesis of Vinyl Polymer Having Organic UV Absorptive Group and Hydroxyl Group (2-B)

Synthesis Example 1

A 2-L (liter) flask equipped with a stirrer, condenser and thermometer was charged with 167 g of diacetone alcohol as solvent, which was heated at 80° C. under a nitrogen stream. A monomer mix solution was previously prepared by mixing 81.0 g of 2-[2'-hydroxy-5'-(2-methacryloxyethyl)phenyl]-2H-benzotriazole (RUVA-93, Otsuka Chemical Co., Ltd.), 90.0 g of methacryloxypropyltrimethoxysilane (KBM-503, Shin-Etsu Chemical Co., Ltd.), 22.5 g of glycigyl methacrylate, 256.5 g of methyl methacrylate, and 335 g of diacetone alcohol. An initiator solution was previously prepared by dissolving 2.3 g of 2,2'-azobis(2-methylbutyronitrile) as a polymerization initiator in 177.7 g of diacetone alcohol. A 390 g portion of the monomer mix solution and an 80 g portion of the initiator solution were sequentially admitted into the flask, which was heated at 80° C. for 30 minutes, allowing reaction to run. The remainder of the monomer mix solution and the remainder of the initiator solution were concurrently added dropwise at 80-90° C. over 1.5 hours, followed by stirring at 80-90° C. for 5 hours. There was obtained a vinyl polymer having organic UV absorptive group and hydroxyl group (2-B-a).

The vinyl polymer (2-B-a) had a nonvolatile concentration of 40.1 wt % and a viscosity of 8,580 milliPascals second (mPa-s). This copolymer contained 18 wt % of the UV absorbing monomer, 20 wt % of the alkoxysilyl-containing vinyl monomer, and 5 wt % of the epoxy-containing vinyl monomer. The polymer had a Mw of 52,900 as measured by GPC.

Synthesis Examples 2 to 5

A series of vinyl polymers having organic UV absorptive group and reactive group (2-B-b) to (2-B-e) were synthesized by the same procedure as in Synthesis Example 1 except that the type and amount of monomer were changed as shown in Table 1.

Synthesis of Silicone Resin (2-D)

Synthesis Example 6

A 1-L flask was charged with 65 g (0.48 Si-mol) of 1,2-ethylenebis(trimethoxysilane), 300 g of IPA-ST (silica sol dispersed in isopropanol, Nissan Chemical Industries, Ltd.), 100 g of isopropanol, and 2 g of Lewatit K2649DR (cation exchange resin, Lanxess). At room temperature, 40 g of deionized water was added to the solution, which was stirred for 3 hours at an internal temperature of 40° C. to bring hydrolytic condensation to completion. The reaction solution was cooled to room temperature, whereupon 170 g of acetylacetone, 6 g of aluminum acetylacetonate as a curing catalyst, and 0.1 g of polyether-modified silicone KP-341 (Shin-Etsu Chemical Co., Ltd.) as a leveling agent were added. Stirring yielded a silicone resin solution (2-D-a) having a nonvolatile concentration of 20.2 wt %, a Mw of 1,830, and a polydispersity index of 1.72.

Synthesis Example 7

The procedure of Synthesis Example 2 was repeated except that 49.5 g (0.24 Si-mol) of X-12-965 (tris(3-trimethoxysilylpropyl)isocyanurate, Shin-Etsu Chemical Co., Ltd.) was used instead of 1,2-ethylenebis(trimethoxysilane). The solution was diluted with isopropanol to a nonvolatile concentration of 20 wt %. A silicone resin solution (2-D-b) was obtained having a nonvolatile concentration of 18.9 wt %, a Mw of 1,830, and a polydispersity index of 2.05.

Preparation of Composite Coating Composition (2)

Preparation Example 1

First 40 g of vinyl copolymer (2-B-a) in Synthesis Example 1, 13.3 g of inorganic oxide nanoparticle (2-A-a), and 26.7 g of propylene glycol methyl ether were thoroughly mixed. The mixture was filtered through a nylon mesh strainer, yielding a composite coating composition (2-a).

Preparation Examples 2 to 6 & Comparative Preparation Examples 1 to 2

The procedure of Preparation Example 1 was followed except that the type and amount of vinyl copolymer and inorganic oxide nanoparticle were changed as shown in Table 2, and an additive was optionally added. There were obtained composite coating compositions (2-b) to (2-f) and comparative coating compositions (2-g) and (2-h).

Preparation and Evaluation of Laminate

Example 1

Composite coating composition (2-a) in Preparation Example 1 was flow coated onto a cleaned surface of a Lexan® polycarbonate panel (150 mm by 150 mm by 4 mm thick) and heat cured at 120° C. for 60 minutes to form a cured film of 9 micrometer (μm) to 14 μm thick as intermediate layer (II). Subsequently, plasma polymerization was carried out to deposit a film composed of silicon, oxygen, carbon and hydrogen on the cured film as outermost layer (I), yielding a laminate. Specifically, prior to plasma polymerization, the substrate having a cured film of the composite coating composition formed thereon was cleaned by manual operation using an isopropyl alcohol/deionized water-drenched lint-free cloth. Plasma polymerization was then carried out in a vacuum chamber by the continuous, 2-sided expanding thermal plasma process (C. D. Iacovangelo et al., "Expanding thermal plasma deposition system", US Patent Application 2005/0202184, Mar. 8, 2005). Two plasma coating stations consisted of arrays of ETP sources that created argon plasma jets at supersonic speeds. The plasma jets expanded in the plasma coating stations and reacted with an organosilicon reagent and oxidizing agent that were injected directly into the chamber. The organosilicon reagent used for the trials was octamethylcyclotetrasiloxane (Gelest) and the oxidizing agent was industrial grade oxygen, 99% (Airgas). The substrate was continuously transported through the chamber and heated to approximately 40-70° C. before entering the coating stations.

Variables of the plasma process included the temperature of the heaters in the pre-heat chamber, the linear speed of transport, and the molar ratio of the Ar+ ions exiting the plasma source to the organosilicon and the oxygen molecules. The individual flow rates of the gases were adjusted in order to achieve the desired ratios of the reactant mixture. The process pressure ranged from 30 to 50 milliTorr (mTorr). These process variables were adjusted so as to form a solid layer with specific chemical and physical properties in order to achieve adhesion to the intermediate layer (II) as well as impart mar resistance and other performance requirements for the laminate. The plasma process conditions are shown in Table 3.

Examples 2 to 6

Laminates were manufactured by the same procedure as in Example 1 aside from using composite coating compositions (2-b) to (2-f) in Preparation Examples 2 to 6. The laminates were evaluated by the following tests, with the results shown in Table 4.

Comparative Examples 1 to 4

Laminates were manufactured by the same procedure as in Example 1 aside from using composite coating compositions (2-g) and (2-h) in Comparative Preparation Examples 1 and 2. In Comparative Preparation Example 3, laminate was manufactured by the same procedure as in Example 1 without outermost layer (I). In Comparative Preparation Example 4, laminate was manufactured by the same procedure as in Comparative Preparation Example 3, and then coated with the silicone hardcoating composition in the synthesis example 5 of JP-A 2008-120986.

The laminates were evaluated by the following tests, with the results shown in Table 4.

Mar Resistance (ΔHz)

Mar resistance was analyzed according to ASTM D1044 by mounting a Taber abrasion tester with wheels CS-10F, measuring a haze by a haze meter after 1,000 cycles under a load of 500 g, and calculating a haze difference (ΔHz) before and after the test. ΔHz of less than or equal to 2.5% are regarded as passing.

Initial Adhesion

Adhesion was analyzed by a cross-hatch adhesion test according to ASTM D3359 Method B, specifically by scribing the laminate with a razor along 11 longitudinal and 11 transverse lines at a spacing of 1 mm to define 100 square sections, tightly attaching adhesive tape thereto, rapidly pulling back the adhesive tape at an angle of 90°, and calculating the percent area of coating sections kept unpeeled. An initial adhesion of greater than or equal to 97% is regarded as passing.

Adhesion after Water Immersion

The laminate was immersed in deionized water at 65° C. for 3 days before it was examined by the adhesion test. The laminate was also immersed in de-ionized water at 100° C. for 2 hours before it was examined by the adhesion test ASTM D3359 Method B. Adhesion after water immersion of greater than or equal to 97% is regarded as passing.

Weather Resistance

A weathering test was carried out by Eyesuper UV tester W-151 (Iwasaki Electric Co., Ltd.) which operated one cycle of [black panel temperature 63° C., humidity 50% RH (relative humidity), illuminance 50 milliWatts per square centimeter (mW/cm$^2$), raining intervals of 10 sec/hour for 4 hours] and [black panel temperature 30° C., humidity 95% RH for one hour]. The test repeated 40 cycles and 70 cycles. A yellowing index (YI) was measured according to JIS K7103 before and after the test, from which a change of yellowing index (ΔYI) was computed. The weathered laminate was also examined for cracks and delamination with naked eyes or under a microscope of 250 magnifying power. ΔYI of less than or equal to 1.0 and appearance intact (no cracks and delamination) after 40 cycles are regarded as passing.

Crack

The coating appearance after the weathering test was rated according to the following criterion.

○: intact

Δ: some cracks x: cracks on entire coating

Delamination

The coating after the weathering test was rated according to the following criterion.

○: intact

Δ: some delamination x: overall delamination

TABLE 1

Composition of vinyl copolymer having organic UV-absorptive group and reactive group (2-B)

| | | Synthesis Example | | | | |
|---|---|---|---|---|---|---|
| | | 1 | 2 | 3 | 4 | 5 |
| Vinyl copolymer (2-B) | | 2-B-a | 2-B-b | 2-B-c | 2-B-d | 2-B-e |
| UV-absorptive group-containing vinyl monomer (2-B-i) | RUVA-1 | 81.0 (18%) | 103.5 (23%) | 103.5 (23%) | — | 81.0 (18%) |
| | RUVA-2 | — | — | 22.5 (5%) | — | — |
| Reactive group-containing vinyl monomer (2-B-ii) | HEMA | — | 67.5 (15%) | 45.0 (10%) | 67.5 (15%) | — |
| | MATMS | 90.0 (20%) | — | 76.5 (17%) | — | — |
| | GMA | 22.5 (5%) | — | — | — | — |
| Other monomer (2-B-iii) | MMA | 256.5 (57%) | 274.5 (61%) | 202.5 (45%) | 301.5 (67%) | 184.5 (41%) |
| | EMA | — | — | — | 81.0 (18%) | 184.5 (41%) |
| | MHALS | — | 4.5 (1%) | — | — | — |
| Total charge | | 450 | 450 | 450 | 450 | 450 |
| Nonvolatile (%) | | 40.1 | 39.7 | 40.2 | 40.8 | 42.0 |
| Viscosity (mPa-s) | | 8,580 | 6,610 | 7,520 | 5,860 | 8,040 |
| Mw by GPC | | 52,900 | 49,400 | 51,000 | 50,400 | 57,700 | unit: parts by weight (wt % based on solids)
RUVA-1: 2-[2'-hydroxy-5'-(2-methacryloxyethyl)phenyl]-2H-benzotriazole (RUVA-93, Otsuka Chemical Co., Ltd.)
UVA-2: 2-hydroxy-4-(2-acryloxyethyl)benzophenone; (BP-1A, Osaka Organic Chemistry Co., Ltd.)
HEMA: 2-ethyl hydroxymethacrylate
MATMS: methacryloxypropyltrimethoxysilane
GMA: glycigyl methacrylate
MMA: methyl methacrylate
EMA: ethyl methacrylate
MHALS: 1,2,2,6,6-pentamethyl-4-piperidyl methacrylate

TABLE 2

Formulation of composite coating composition (2)

| | Preparation Example | | | | | | Comparative Example | |
|---|---|---|---|---|---|---|---|---|
| | 1 | 2 | 3 | 4 | 5 | 6 | 1 | 2 |
| Composite coating composition (2) | 2-a | 2-b | 2-c | 2-d | 2-e | 2-f | 2-g | 2-h |
| Inorganic oxide nanoparticles (2-A) | 2-A-a 13.3 (20%) | 2-A-a 20 (30%) | 2-A-b 40 (30%) | 2-A-a 26.7 (40%) | 2-A-a 9.3 (14%) | 2-A-a 3.3 (5%) 2-A-b 26.7 (20%) | 2-A-a 13.3 (20%) | 2-A-a 20 (30%) |
| Vinyl copolymer (2-B) | 2-B-a 40 (55%) | 2-B-a 35 (70%) | 2-B-b 35 (70%) | 2-B-c 30 (60%) | 2-B-c 28 (56%) | 2-B-c 32.5 (65%) | 2-B-d 40 (80%) | 2-B-e 35 (70%) |
| Solvent (2-C) | PGM 26.7 | PGM 25 | PGM 5 | PGM 24.5 | PGM 12.7 | PGM 7.5 | PGM 26.7 | PGM 25 |
| Silicone resin solution (2-D) | — | — | — | — | 2-D-a 30 (30%) | 2-D-b 10 (10%) | — | — |

TABLE 2-continued

Formulation of composite coating composition (2)

|  | Preparation Example | | | | | | Comparative Example | |
|---|---|---|---|---|---|---|---|---|
|  | 1 | 2 | 3 | 4 | 5 | 6 | 1 | 2 |
| Organic UV absorber other than (2-B) | — | — | — | T400 0.4 | — | — | — | — |
| Additive | — | — | B882N 2 | — | — | B882N 2 | — | — | unit: parts by weight (wt % based on solids)
PGM: propylene glycol methyl ether
T400: triazine based UV absorber; (Tinuvin 400, Ciba Specialities)
B882N: blocked isocyanate; (Takenate B-882N, Mitsui Chemical Polyurethane Co., Ltd., solids concentration 70%, butyl acetate solution)

TABLE 3

Plasma Process Conditions

| Plasma Recipe Code | 4619-1 | 619-2 | 4619-3 | 4619-4 | 4619-5 | 4778-1 | 4778-2 | 4822-1 |
|---|---|---|---|---|---|---|---|---|
| Linear transport speed (mm/s) | 23 | 23 | 23 | 23 | 23 | 18 | 18 | 18 |
| Pre-heat temperature (on heater surface, °F. (°C.)) | 300 (149) | 300 (149) | 200 (93) | 300 (149) | 300 (149) | 250 (121) | 250 (121) | 250 (121) |
| organosilicon/$Ar^+$/$O_2$ molar ratio of sub-layer on intermediate layer (II) side | 0.30/ 0.70/ 0 | 0.30/ 0.70/ 0 | 0.30/ 0.70/ 0 | 0.30/ 0.70/ 0 | 0.23/ 0.53/ 0.23 | 0.30/ 0.70/ 0 | 0.23/ 0.53/ 0.23 | 0.30/ 0.70/ 0 |
| organosilicon/$Ar^+$/$O_2$ molar ratio of sub-layer on surface side | 0.21/ 0.29/ 0.50 | 0.13/ 0.25/ 0.62 | 0.13/ 0.25/ 0.62 | 0.13/ 0.25/ 0.62 | 0.13/ 0.25/ 0.62 | 0.13/ 0.25/ 0.62 | 0.13/ 0.25/ 0.62 | 0.13/ 0.25/ 0.62 |
| Refractive index of sub-layer on intermediate layer (II) side | 1.453 | 1.453 | 1.453 | 1.453 | 1.457 | 1.453 | 1.457 | 1.453 |
| Refractive index of sub-layer on surface side | 1.436 | 1.432 | 1.432 | 1.432 | 1.432 | 1.432 | 1.432 | 1.432 |
| Indentation hardness of sub-layer on intermediate layer (II) side (GPa) | 1.65 | 1.65 | 1.65 | 1.65 | 2.35 | 1.65 | 2.35 | 1.65 |
| Indentation hardness of sub-layer on surface side (GPa) | 2.09 | 2.47 | 2.47 | 2.47 | 2.47 | 2.47 | 2.47 | 2.47 |
| Total thickness of sub-layers (μm) | 2.6 | 2.6 | 2.6 | 2.4 |  | 3.0 | 3.1 | 3.1 |

TABLE 4

Test results of laminate

|  | Example | | | | | | Comparative Example | | | |
|---|---|---|---|---|---|---|---|---|---|---|
| Coating system | 1 | 2 | 3 | 4 | 5 | 6 | 1 | 2 | 3 | 4 |
| Composite coating composition | 2-a | 2-b | 2-c | 2-d | 2-e | 2-f | 2-g | 2-h | 2-a | 2-a |
| Thickness (μm) | 12 | 13 | 13 | 13 | 12 | 13 | 13 | 12 | 12 | 13 |
| Plasma recipe code | 4822-1 | 4822-1 | 4778-1 | 4778-1 | 4822-1 | 4822-1 | 4822-1 | 4822-1 | — | *SC |
| Thickness (μm) | 3.1 | 3.1 | 3.0 | 3.0 | 3.1 | 3.1 | 3.1 | 3.1 |  | (3.8) |

Test results of laminate

| Mar resistance ΔHz, % | 0.7 | 1.0 | 1.7 | 1.5 | 2.1 | 1.5 | 1.9 | 3.0 | 17.1 | 8.9 |
| Initial adhesion after water immersion 65° C./3 days | % | 100 | 99 | 100 | 99 | 100 | 99 | 100 | 0 | 99 | 100 |
| | Appearance | pass | pass | pass | pass | pass | pass | pass | pass | pass | pass |

TABLE 4-continued

Test results of laminate

| | Coating system | Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Adhesion after water immersion 65° C./3 days, | % Appearance | 100 pass | 100 pass | 99 pass | 100 pass | 99 pass | 100 pass | 100 pass | — — | 100 pass | 100 pass |
| Weathering test @ 40 cycles | ΔYI Crack Delamination | 0.56 ○ ○ | 0.86 ○ ○ | 0.59 ○ ○ | −0.21 ○ ○ | 0.33 ○ ○ | 0.29 ○ ○ | 15.45 ○ x | 0.26 ○ x | 0.62 ○ ○ | 1.12 ○ ○ |
| Weathering test @ 70 cycles | ΔYI Crack Delamination | 1.81 ○ ○ | 2.19 ○ ○ | 0.98 ○ ○ | 1.36 ○ ○ | 1.93 ○ ○ | 1.18 ○ ○ | — — — | — — — | 1.98 ○ ○ | 2.36 ○ ○ |

*SC = coated with the silicone hardcoating composition set forth in the synthesis example 5 of JP-A 2008-120986

As can be seen from the Table 4, with the compositions of the present laminate, the Mar resistance improved substantially. The present Examples, had a ΔHz of less than or equal to 2.5% while having a ΔYI of less than or equal to 1.0 after weathering test at 40 cycles, specifically, less than or equal to 0.9, and even less than or equal to 0.6. In the Comparative Example 1, however, ΔHz was 1.9%, ΔYI was greater than 15 due to no UV-absorptive group in component (2-B). In the Comparative Example 2, however, ΔHz was 3.0% and ΔYI was less than 1.0, initial adhesion after water immersion was failed due to no reactive group in component (2-B). In the Comparative Examples 3 and 4, however, ΔYI were less than or equal to 1.12, ΔHz were greater than 2.5%. Because the Comparative Example 3 had no plasma outermost layer (I) and the Comparative Example 4 had other outermost layer coated with the silicone hardcoating composition instead of plasma layer (I). The Comparative Examples failed to attain the combination of properties obtained with the disclosed laminates.

In an embodiment, an organic resin laminate having weather resistance and mar resistance, can comprise an organic resin substrate and a multilayer coating system on a surface of a substrate. The multilayer coating system can include an outermost layer (I) which is a hard film resulting from plasma polymerization of an organosilicon compound and an intermediate layer (II) which is a cured film formed from a composite coating composition (2), the intermediate layer (II) having one surface disposed contiguous to the outermost layer and another surface disposed contiguous to the organic resin substrate. The composite coating composition (2) cam comprise: (2-A) an inorganic oxide nanoparticle comprising a member selected from the group consisting of silica, zinc oxide, titanium oxide, cerium oxide, and combinations comprising at least one of the foregoing members; (2-B) a vinyl copolymer having an organic UV-absorptive group and a reactive group selected from among alkoxysilyl, hydroxyl, epoxy, carboxylic acid and amino groups; and (2-C) a solvent.

In one embodiment, a method of making an organic resin laminate, comprises: forming an organic resin substrate; applying a composite coating composition (2) to a surface of the substrate and forming an outermost layer (I) onto the composite coating composition by plasma polymerization of an organosilicon compound. The composite coating composition can comprise: (2-A) an inorganic oxide nanoparticle comprising a member selected from the group consisting of silica, zinc oxide, titanium oxide, cerium oxide, and combinations comprising at least one of the foregoing members; (2-B) a vinyl copolymer having an organic UV-absorptive group and a reactive group selected from among alkoxysilyl, hydroxyl, epoxy, carboxylic acid and amino groups; and (2-C) a solvent. In the various embodiments, (i) the substrate can be formed by extrusion, co-extrusion, or lamination; and (ii) the substrate can be a single layer in physical contact with the composite coating composition; or (iii) forming the substrate can comprise coextruding a plastic (e.g., transparent plastic (i.e., optically clear)) and a cap-layer or forming the substrate can comprise laminating a plastic (e.g., transparent plastic (i.e., optically clear)) and a cap-layer.

In the various embodiments of the method and laminate set forth above, (i) the outermost layer (I) can be a hard film obtained from plasma polymerization and oxidation of an organosilicon compound and comprising silicon, oxygen, carbon, and hydrogen; and/or (ii) the outermost layer (I) can include an inner sub-layer and an outer sub-layer, properties of the sub-layers being adjusted so as to achieve adhesion to the intermediate layer (II) and to impart mar resistance to the coating system; and/or (iii) the inner sub-layer can have a refractive index in the range of 1.449 to 1.463; and/or (iv) the outer sub-layer can have a refractive index in the range of 1.430 to 1.434; and/or (v) the inner sub-layer can have a nano-indentation hardness in the range of 1.616 to 1.676 GPa; and/or (vi) the outer sub-layer can have a nano-indentation hardness in the range of 2.265 to 2.667 GPa; and/or (vii) the outermost layer (I) can have a total thickness in the range of 2.5 to 5.0 μm; and/or (viii) the outermost layer (I) can have a total thickness in the range of 2.7 to 4.5 μm; and/or (ix) the laminate can exhibit a pass rate of at least 97% in the adhesion test of ASTM D3359 Method B and ASTM D870 using de-ionized water at 65° C. for 3 days and a delta haze value of less than 2% in the Taber abrasion test of ASTM D1044 using 1000 cycles; and/or (x) the vinyl copolymer (2-B) can be a copolymer comprising (2-B-i) 5 wt % to 50 wt % of a vinyl monomer having an organic UV-absorptive group, (2-B-ii) 2 wt % to 30 wt % of a vinyl monomer having a reactive group selected from among alkoxysilyl, hydroxyl, epoxy, carboxylic acid, amino groups, and combinations comprising at least one of the foregoing reactive groups, and (2-B-iii) 20 wt % to 93 wt % of another monomer capable of copolymerizing with the vinyl monomers; and/or (xi) the reactive group can be selected from among alkoxysilyl, hydroxyl, epoxy groups, and combinations comprising at least one of the foregoing reactive groups; and/or (xii) the silicone resin (2-A) can be obtained from alkoxysilanes of formulae (1), (2) and (3) which are combined such that a ratio of (1)/[(2)+(3)] is from 50/50 to 0/100 in Si-mol %; and/or (xiii) 1 the silicone resin (2-A) can be obtained from hydrolytic condensation of a member selected from alkoxysilanes having formulae (2) and (3) and partial hydrolytic condensates thereof; and/or (xiv) the silicone resin (2-A) can be obtained from hydrolytic condensation of an alkoxysilane having formula (3) and partial hydrolytic condensate thereof; and/or (xv) the composite coating composition (2) can further comprise an organic UV absorber and/or organic UV stabilizer other than (2-B); and/or (xvi) the organic resin substrate can be a molded polycarbonate resin; and/or (xvii) the substrate is a single layer and wherein the multilayer coating system is in physical contact with the surface of the substrate; and/or (xviii) the substrate is a multilayer substrate comprising a coextruded or laminated base resin and cap-layer, wherein the multilayer coating system is in physical contact with the surface of the substrate; (xix) the cap-layer comprises a material selected from the group consisting of a urethane resin, an acrylic resin, and combinations comprising at least one of the foregoing; and/or (xx) the composite coating composition (2) can further comprise (2-D), wherein (2-D) can be a silicone resin obtained from (co)hydrolytic condensation of a member selected from alkoxysilanes having the general formulae (1) to (3) and partial hydrolytic condensates thereof,

$$(R^1)_m(R^2)_n Si(OR^3)_{4-m-n} \quad (1)$$

wherein $R^1$ and $R^2$ are each independently hydrogen or a substituted or unsubstituted monovalent hydrocarbon group, $R^1$ and $R^2$ may bond together, $R^3$ is $C_1$-$C_3$ alkyl, m and n are independently 0 or 1, and m+n is 0, 1 or 2,

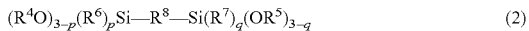

$$(R^4O)_{3-p}(R^6)_p Si\text{—}R^8\text{—}Si(R^7)_q(OR^5)_{3-q} \quad (2)$$

wherein $R^4$ and $R^5$ are each independently $C_1$-$C_3$ alkyl, $R^6$ and $R^7$ are each independently hydrogen or a substituted or unsubstituted monovalent hydrocarbon group, $R^8$ is oxygen, phenylene, or substituted or unsubstituted $C_2$-$C_{10}$ alkylene, p and q are independently 0 or 1,

$$X\text{—}[(R^{15})Si(R^{16})_y(OR^{17})_{3-y}]_z \quad (3)$$

wherein X is a 1,3,5-trimethylcyclotrisiloxane residue, 1,3,5,7-tetramethylcyclotetrasiloxane residue or isocyanurate residue, $R^{15}$ is $C_1$-$C_3$ alkylene, $R^{16}$ is hydrogen or a substituted or unsubstituted monovalent hydrocarbon group, $R^{17}$ is $C_1$-$C_3$ alkyl, y is 0 or 1, and z is an integer of 3 to 4; and/or (xviii) in formula (1), $R^1$ is a monovalent hydrocarbon group substituted with a methyl or UV absorptive group, m=1, n=0, and $R^3$ is methyl, in formula (2), $R^8$ is substituted or unsubstituted $C_2$-$C_8$ alkylene, p=q=0, $R^4$ and $R^5$ are methyl, and in formula (3), X is isocyanurate residue, y=0, $R^{15}$ is propylene, $R^{17}$ is methyl, and z=3.

As used herein, the term laminate is intended to refer to an element constructive of multiple layers, wherein the layers can be formed via any appropriate process, such as extrusion, co-extrusion, bonded film, film insert molding, wet coating, plasma deposition, lamination, and so forth, as well as combinations comprising any of the foregoing processes. The notation ($C_n$-$C_m$) means a group containing from n to m carbon atoms per group. UV refers to the ultraviolet region of the electromagnetic spectrum. Mw refers to a weight average molecular weight as measured by gel permeation chromatography (GPC) versus polystyrene standards. The terminology "(meth)acrylate" refers collectively to acrylate and methacrylate. All ranges disclosed herein are inclusive of the endpoints, and the endpoints are independently combinable with each other (e.g., ranges of "less than or equal to 25 wt %, or, more specifically, 5 wt % to 20 wt %", is inclusive of the endpoints and all intermediate values of the ranges of "5 wt % to 25 wt %," etc.).

"Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An organic resin laminate having weather resistance and mar resistance, comprising an organic resin substrate and a multilayer coating system on a surface of the substrate,
    the multilayer coating system including an outermost layer (I) which is a hard film resulting from plasma polymerization of an organosilicon compound and an intermediate layer (II) which is a cured film formed from a composite coating composition (2), the intermediate layer (II) having one surface disposed contiguous to the outermost layer and another surface disposed contiguous to the organic resin substrate,
    wherein the composite coating composition (2) comprises
        (2-A) an inorganic oxide nanoparticle;
        (2-B) a vinyl copolymer; and
        (2-C) a solvent;
        wherein the inorganic oxide nanoparticle comprises at least one of silica, zinc oxide, titanium oxide, and cerium oxide;
        wherein the vinyl copolymer has an organic UV-absorptive group and a reactive group; and
        wherein the reactive group is selected from among alkoxysilyl, hydroxyl, epoxy, carboxylic acid and amino groups;
    wherein the outermost layer (I) includes an inner sub-layer and an outer sub-layer, wherein the inner sub-layer has a refractive index in the range of 1.449 to 1.463 and the outer sub-layer has a refractive index in the range of 1.430 to 1.434;
    wherein the inner sub-layer has a nano-indentation hardness in the range of 1.616 to 1.676 GPa and the outer sub-layer has a nano indentation hardness in the range of 2.265 to 2.667GPa; and wherein the inner sub-layer is contiguous with the intermediate layer (II).

2. The laminate of claim 1, wherein the outermost layer (I) is a hard film obtained from plasma polymerization and oxidation of an organosilicon compound and comprising silicon, oxygen, carbon, and hydrogen.

3. The laminate of claim 1, wherein the substrate is a single layer and wherein the multilayer coating system is in physical contact with the surface of the substrate.

4. The laminate of claim 1, wherein the substrate is a multilayer substrate comprising a coextruded or laminated base resin and cap-layer, wherein the multilayer coating system is in physical contact with the surface of the substrate.

5. The laminate of claim 4, wherein the cap-layer comprises a material selected from the group consisting of a urethane resin, an acrylic resin, and combinations comprising at least one of the foregoing.

6. The laminate of claim 1, wherein the outermost layer (I) has a total thickness in the range of 2.5 to 5.0 μm.

7. The laminate of claim 1, wherein the outermost layer (I) has a total thickness in the range of 2.7 to 3.5 μm.

8. The laminate of claim 1, wherein the laminate exhibits a pass rate of at least 97% in the adhesion test of ASTM D3359 Method B and ASTM D870 using de-ionized water at 65° C. for 3 days and a delta haze value of less than 2% in the Taber abrasion test of ASTM D1044 using 1000 cycles.

9. The laminate of claim 1, wherein the vinyl copolymer (2-B) is a copolymer comprising (2-B-i) 5 wt % to 50 wt % of a vinyl monomer having an organic UV absorptive group, (2-B-ii) 2 wt % to 30 wt % of a vinyl monomer having a reactive group selected from among alkoxysilyl, hydroxyl, epoxy, carboxylic acid, amino groups, and combinations comprising at least one of the foregoing reactive groups, and (2-B-iii) 20 wt % to 93 wt % of another monomer capable of copolymerizing with the vinyl monomers.

10. The laminate of claim 9, wherein the reactive group is selected from among alkoxysilyl, hydroxyl, epoxy groups, and combinations comprising at least one of the foregoing reactive groups.

11. The laminate of claim 1, wherein the composite coating composition (2) further comprises (2-D) a silicone resin obtained from (co)hydrolytic condensation of a member selected from alkoxysilanes having the general formulae (1) to (3) and partial hydrolytic condensates thereof, $$(R^1)_m(R^2)_n Si(OR^3)_{4-m-n} \quad (1)$$

wherein $R^1$ and $R^2$ are each independently hydrogen or a substituted or unsubstituted monovalent hydrocarbon group, $R^1$ and $R^2$ may bond together, $R^3$ is $C_1$-$C_3$ alkyl, m and n are independently 0 or 1, and m+n is 0, 1 or 2, $$(R^4O)_{3-p}(R^6)_p Si\text{—}R^8\text{—}Si(R^7)_q(OR^5)_{3-q} \quad (2)$$

wherein $R^4$ and $R^5$ are each independently $C_1$-$C_3$ alkyl, $R^6$ and $R^7$ are each independently hydrogen or a substituted or unsubstituted monovalent hydrocarbon group, $R^8$ is oxygen, phenylene, or substituted or unsubstituted $C_2$-$C_{10}$ alkylene, p and q are independently 0 or 1, $$X\text{—}[(R^{15})Si(R^{16})_y(OR^{17})_{3-y}]_z \quad (3)$$

wherein X is a 1,3,5-trimethylcyclotrisiloxane residue, 1,3,5,7-tetramethylcyclotetrasiloxane residue or isocyanurate residue, $R^{15}$ is $C_1$-$C_3$ alkylene, $R^{16}$ is hydrogen or a substituted or unsubstituted monovalent hydrocarbon group, $R^{17}$ is $C_1$-$C_3$ alkyl, y is 0 or 1, and z is an integer of 3 to 4.

12. The laminate of claim 11, wherein the silicone resin (2-D) is obtained from alkoxysilanes of formulae (1), (2) and (3) which are combined such that a ratio of (1)/[(2)+(3)] is from 50/50 to 0/100 in Si-mol %.

13. The laminate of claim 11, wherein in formula (1), $R^1$ is a monovalent hydrocarbon group substituted with a methyl or UV absorptive group, m=1, n=0, and $R^3$ is methyl, in formula (2), $R^8$ is substituted or unsubstituted $C_2$-$C_8$ alkylene, p=q=0, $R^4$ and $R^5$ are methyl, and in formula (3), X is isocyanurate residue, y=0, $R^{15}$ is propylene, $R^{17}$ is methyl, and z=3.

14. The laminate of claim 1, wherein the silicone resin (2-D) is obtained from hydrolytic condensation of a member selected from alkoxysilanes having formulae (2) and (3) and partial hydrolytic condensates thereof.

15. The laminate of claim 1, wherein the silicone resin (2-D) is obtained from hydrolytic condensation of an alkoxysilane having formula (3) and partial hydrolytic condensate thereof.

16. The laminate of claim 1, wherein the composite coating composition (2) further comprises an organic UV absorber and/or organic UV stabilizer other than (2-B).

17. The laminate of claim 1, wherein the organic resin substrate is a molded polycarbonate resin.

18. A method of making an organic resin laminate, comprising:
    forming a an organic resin substrate;
    applying a composite coating composition (2) to a surface of the substrate, wherein the composite coating composition comprises
        (2-A) an inorganic oxide nanoparticle ;
        (2-B) a vinyl copolymer; and
        (2-C) a solvent;
        wherein the inorganic oxide nanoparticle comprises at least one of silica, zinc oxide, titanium oxide, and cerium oxide;
        wherein the vinyl copolymer has an organic UV-absorptive group and a reactive group; and
            wherein the reactive group is selected from among alkoxysilyl, hydroxyl, epoxy, carboxylic acid and amino groups;
    forming an outermost layer (I) onto the composite coating composition by plasma polymerization of an organosilicon compound; and
    curing the coating composition (2) to form an intermediate layer (II); wherein the outermost layer (I) includes an inner sub-layer and an outer sub-layer, wherein the inner sub-layer is contiguous with the intermediate layer (II)
        wherein the inner sub-layer has a refractive index in the range of 1.449 to 1.463 and the outer sub-layer has a refractive index in the range of 1.430 to 1.434; and
        wherein the inner sub-layer has a nano-indentation hardness in the range of 1.616 to 1.676 GPa and the outer sub-layer has a nano indentation hardness in the range of 2.265 to 2.667 GPa.

* * * * *